(12) United States Patent
Liu et al.

(10) Patent No.: US 12,433,816 B2
(45) Date of Patent: Oct. 7, 2025

(54) SYSTEMS AND METHODS FOR PROVIDING SEXUAL ENTERTAINMENT BY MONITORING TARGET ELEMENTS

(71) Applicant: HYTTO PTE. LTD., Singapore (SG)

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/928,125

(22) Filed: Oct. 27, 2024

(65) Prior Publication Data

US 2025/0134757 A1    May 1, 2025

Related U.S. Application Data

(60) Provisional application No. 63/594,930, filed on Oct. 31, 2023.

(51) Int. Cl.
| | |
|---|---|
| *A61H 19/00* | (2006.01) |
| *G06F 3/01* | (2006.01) |
| *G06T 11/00* | (2006.01) |
| *H04N 21/2187* | (2011.01) |

(52) U.S. Cl.
CPC ............. *A61H 19/00* (2013.01); *G06F 3/011* (2013.01); *G06T 11/00* (2013.01); *H04N 21/2187* (2013.01); *A61H 19/32* (2013.01); *A61H 2201/503* (2013.01); *A61H 2201/5043* (2013.01)

(58) Field of Classification Search
CPC .............. A61H 19/00; A61H 2201/503; A61H 2201/5043
See application file for complete search history.

(56) References Cited

U.S. PATENT DOCUMENTS

| | | | |
|---|---|---|---|
| 10,088,895 B2 * | 10/2018 | Baker | A63F 13/428 |
| 11,712,397 B1 * | 8/2023 | Liu | A61H 19/30 |
| | | | 600/38 |
| 2018/0147110 A1 * | 5/2018 | Cakmak | A61H 19/00 |

* cited by examiner

*Primary Examiner* — Samuel G Gilbert
(74) *Attorney, Agent, or Firm* — Holtz, Holtz & Volek PC

(57) ABSTRACT

The present disclosure relates to methods and systems for providing sexual entertainment by monitoring target elements. The method performed by a system includes monitoring at least one target element and at least one parameter associated with the at least one target element in a real-time environment through a head-mounted display associated with a user. Further, the method includes determining at least one operation entity corresponding to the target element and the parameter. The method further includes configuring a correlation between the at least one operation entity and the at least one target element. The at least one operation entity corresponds to sexual entertainment. The at least one operation entity is configured to perform a set of actions defined corresponding to the parameter associated with the target element, thereby providing sexual entertainment to the user associated with the head-mounted display.

21 Claims, 14 Drawing Sheets

SYSTEMS AND METHODS FOR PROVIDING SEXUAL ENTERTAINMENT BY MONITORING TARGET ELEMENTS

TECHNICAL FIELD

The present disclosure relates to electronic-based adult entertainment systems and methods, and more particularly relates to systems and methods for monitoring target elements in realistic scenarios through detection devices (such as a head-mounted display) to provide sexual entertainment to users.

BACKGROUND

Sexual stimulation can be achieved by an individual or a group of individuals (irrespective of gender) by using various means. Conventionally, self-operated sex toys are used by an individual for experiencing sexual stimulation. However, the individual may not always feel the same level of sexual stimulation at every instance using conventional sex toys as they have limited operating functionality.

Currently, social media and the ability to extend wireless interfaces, local and wide area networking, etc., have contributed to new methods and systems for experiencing sexual stimulation. In one example scenario, the individual may be allowed to experience enhanced sexual stimulation while viewing the sexual content. Additionally, the sex toys are operated to mimic the actions performed in the sexual content. However, in most cases, the sex toys may not be synchronized with the sexual content, thus resulting in an unsatisfied sexual experience while operating the sex toys. In another example scenario, live broadcasts featuring sexual content within the adult entertainment industry are increasing. These live broadcasts have experienced substantial growth over the years. For instance, models engaging in sexual acts, with or without the use of adult toys, are streamed in such live broadcasts. The current method of controlling the sex toy during the live broadcast is primarily reliant on various factors, leading to relatively simple interactions. Consequently, users may fail to provide intense sexual pleasure to viewers as per their individual preferences.

Therefore, there is a need for systems and methods for providing adult entertainment to users that overcome the aforementioned deficiencies along with providing other advantages.

SUMMARY

Various embodiments of the present disclosure disclose systems and methods for rendering mixed reality (MR) simulated environments to provide enhanced sexual stimulation based on monitoring target elements through detection devices.

In an embodiment, a computer-implemented method is disclosed. The computer-implemented method performed by a processor includes monitoring at least one target element and at least one parameter associated with the at least one target element in a real-time environment through a head-mounted display associated with a user. Further, the method includes determining at least one operation entity corresponding to the at least one target element. The method further includes configuring a correlation between the at least one operation entity and the at least one target element. The at least one operation entity corresponds to sexual entertainment. The at least one operation entity is configured to perform a set of actions defined corresponding to the at least one parameter associated with the at least one target element, thereby providing sexual entertainment to the user associated with the head-mounted display.

In another embodiment, a system is disclosed. The system includes a communication interface, a memory configured to store instructions, and a processor communicably coupled to the communication interface and the memory. The processor is configured to execute the instructions stored in the memory and thereby cause the system to monitor at least one target element and at least one parameter associated with the at least one target element in a real-time environment through a head-mounted display associated with a user. Further, the system is configured to determine at least one operation entity corresponding to the at least one target element. The system further configure a correlation between the at least one operation entity and the at least one target element. The at least one operation entity corresponds to sexual entertainment. The at least one operation entity is configured to perform a set of actions defined corresponding to the at least one parameter associated with the at least one target element, thereby providing sexual entertainment to the user associated with the head-mounted display.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

Various embodiments of the present disclosure are described hereinafter with reference to FIG. 1 to FIG. 11.

Figure 1:
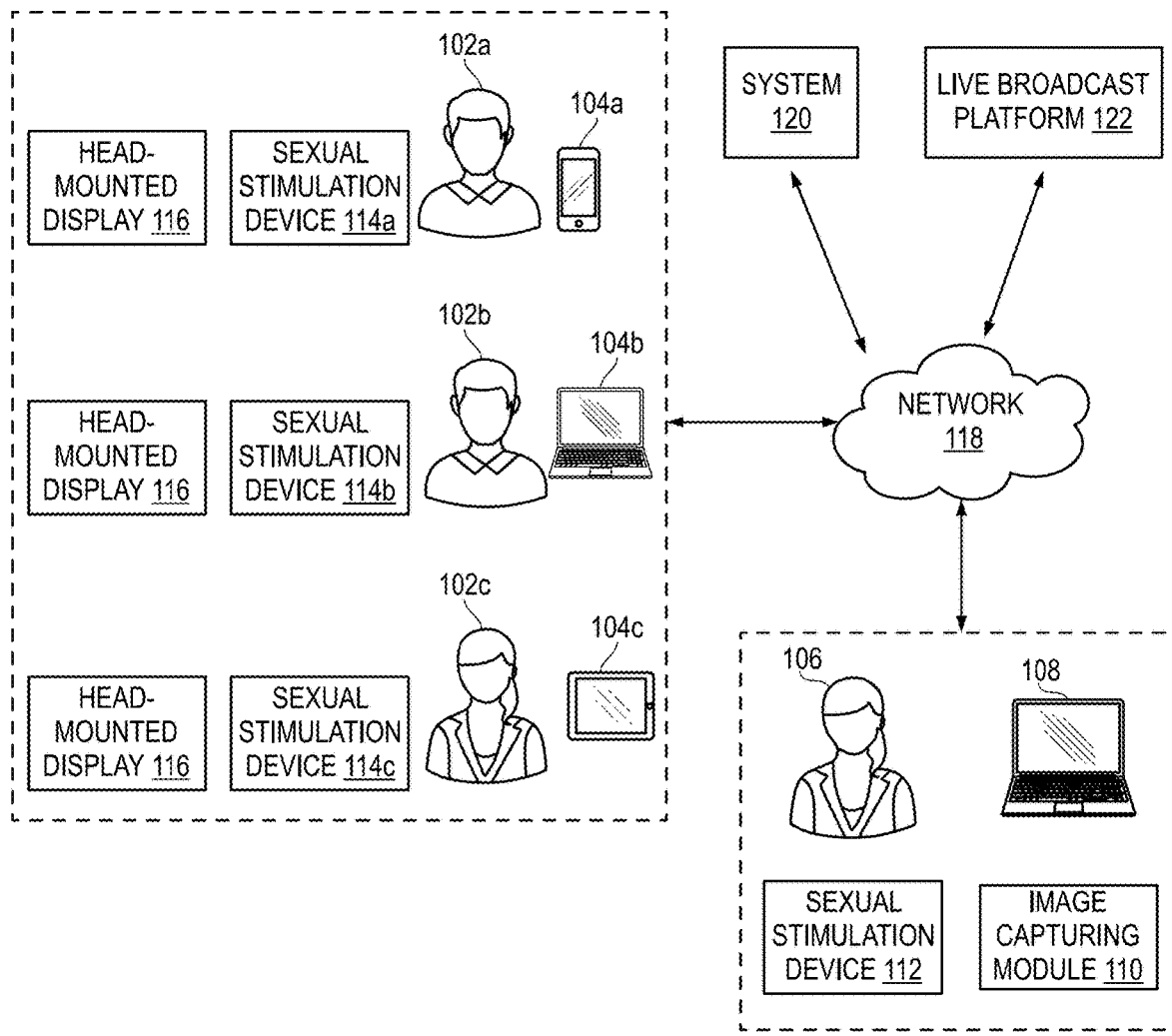
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a plurality of users (collectively referring to a user 102a, a user 102b, and a user 102c). Each of the users 102a, 102b, and 102c is respectively associated with a user device 104a, a user device 104b, and a user device 104c. The user devices 104a-104c may include at least a laptop computer, a phablet computer, a handheld personal computer, a virtual reality (VR) device, a netbook, a Web book, a tablet computing device, a smartphone, or other mobile computing devices. Further, the environment 100 includes a model user 106. In an embodiment, the model user 106 may be a model performing content (e.g., sexual content). As an example, Model User 106 is an adult model on a live streaming platform, and "content" usually refers to content that is suitable for adult viewers and contains adult themes. The following are some specific examples: Adult entertainment performances: Model user 106 may perform adult entertainment, such as striptease, erotic dancing or using adult toys. Adult-themed chat: model user 106 may engage in adult-themed online chats with viewers to discuss mature topics. Role-playing: model user 106 may engage in role-playing, imitating certain adult characters or scenarios for the entertainment of viewers. Adult educational content: modeling user 106 may provide adult educational content, such as sex education, intimacy instruction, etc. The following are some specific examples: Erotic Dance Live Streaming: Model Users 106 perform erotic dance routines in live streams to show off sexy dance moves, and this type of content usually includes more provocative moves and costumes. Adult-themed interactions: During a live broadcast, Model User 106 may engage in adult-themed interactions with viewers, such as answering questions about adult topics or performing a specific act at the request of viewers. Role-playing performances: model users 106 may dress up as specific characters, such as nurses, teachers, etc., and perform related adult performances. The model user 106 may be a real person or a virtual character. For illustration purposes, only one model user is depicted in FIG. 1, however, there can be any number of model users. Furthermore, the model user 106 is associated with a user terminal 108 (exemplarily depicted to be a laptop computer) and an image capturing module 110. The image capturing module 110 may be connected to the user terminal 108 using wired/wireless communication. Some examples of wireless communication may include Bluetooth, near-field communication (NFC), wireless fidelity (Wi-Fi), and the like. In one scenario, the model user 106 may utilize the image capturing module 110 to capture the sexual content being performed by the model user 106. In another scenario, the model user 106 may utilize an image capturing module associated with the user terminal 108 for capturing the model user 106 performing the sexual content.

Furthermore, the users 102a-102c are associated with a sexual stimulation device 114a, a sexual stimulation device 114b, and a sexual stimulation device 114c, respectively, and the model user 106 is associated with a sexual stimulation device 112. The sexual stimulation devices 114a-114c and 112 may be selected based on the gender of the users 102a-102c and the model user 106. For instance, the sexual stimulation devices 114a and 114b are male sex toys, and the sexual stimulation devices 114c and 112 are female sex toys. Some examples of female sex toys may include, but are not limited to, a dildo, a vibrator, and the like. Examples of male sex toys may include masturbators. The sexual stimulation devices 114a-114c may be connected wirelessly with the respective user devices 104a-104c. Further, the sexual stimulation device 112 may be connected wirelessly to the user terminal 108. Some examples of the wireless connectivity may be, but are not limited to, Near-Field communication (NFC), wireless fidelity (Wi-Fi), Bluetooth, and the like.

In addition, each of the users 102a-102c is associated with a head-mounted display 116. The head-mounted display 116 may be connected to the respective user devices (e.g., the user devices 104a-104c) using at least wired or wireless communication protocols. Some examples of the wireless communication protocols may include Near Field Communication (NFC) protocol, wireless fidelity (Wi-Fi), etc. The head-mounted display 116 is an example of a mixed-reality (MR) headset, an augmented reality (AR) headset, and a virtual reality (VR) headset. The head-mounted display 116 is configured to implement spatial computing for rendering simulated environments. In general, mixed reality (MR) is a blend of physical and digital worlds, unlocking natural and intuitive 3D human, computer, and environmental interactions. In other words, mixed reality (MR) relates to a view of the real world—the physical world—with an overlay of digital elements where physical and digital elements can interact.

Various entities in the environment 100 may connect to a network 118 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 118 may include a secure protocol (e.g., Hypertext Transfer Protocol (HTTP)), and/or any other protocol, or set of protocols. In an example embodiment, the network 118 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

The environment 100 further includes a system 120. The system 120 continuously monitors the simulated environments and/or realistic environment rendered by the head-mounted display 116 for providing enhanced sexual stimulation. The system 120 may be embodied in at least one computing device in communication with the network 118. In an embodiment, the system 120 may be embodied in the user devices 104a-104c. In another embodiment, the system 120 may be embodied in the head-mounted display 116. The system 120 may be specifically configured, via executable instructions to perform one or more of the operations described herein. In general, the system 120 is configured to provide adult entertainment which will be explained further in detail.

Further, the environment 100 includes a live broadcast platform 122. In an embodiment, the live broadcast platform 122 may be hosted and managed by the system 120. In another embodiment, the live broadcast platform 122 may be hosted by a third-party application server (not shown in figures) and communicably coupled to the network 118. The live broadcast platform 122 is a set of computer-executable codes configured to allow the model user 106 to create content (e.g., a live broadcast) for the users 102a-102c. In one embodiment, the live broadcast platform 122 may be accessed as a web-based application on the user devices 104a-104c and the user terminal 108. In another embodiment, the user devices 104a-104c and the user terminal 108 may access an instance of the live broadcast platform 122 from the system 120 for installing on the user devices 104a-104c and the user terminal 108 using application stores associated with operating systems such as Apple IOS®, Android™ OS, Google Chrome OS, Symbian OS®, Windows Mobile® OS, and the like.

In an embodiment, a user (e.g., the user 102a) equipped with the head-mounted display 116 may operate the head-mounted display 116 to capture realistic scenes or render simulated environments in the field of view of the user 102a. In other words, the head-mounted display 116 is configured to capture the environment and user movements of the user 102a in the field of view of the user 102a and renders the captured environment to the user 102a. For description purposes, the present disclosure is explained with reference to the user 102a, however, it is to be understood that the present disclosure may be implemented in the same manner by the other users, such as the users 102b and 102c. Further, the head-mounted display 116 is associated with detection sensors to detect/monitor at least one target element in a real-time environment. Some non-limiting examples of the detection sensors associated with the head-mounted display 116 may include Light Detection and Ranging (LiDAR), imaging sensors, eye-tracking sensors, spatial audio detection sensors, hand tracking sensors, proximity and ambient light sensors, Inertial Measurement Unit (IMU). The detection technology or the detection sensors of the head-mounted display 116 work together to create a seamless and immersive mixed-reality experience. In particular, by combining LiDAR, imaging sensors, eye-tracking, hand-tracking, advanced audio detection, and so on, the head-mounted display 116 precisely understands the user's (e.g., the user 102a) environment and actions, thereby enabling intuitive interaction and realistic AR/VR experience or mixed-reality experience.

In recent times, the control of the sexual stimulation devices 114a-114c and the sexual stimulation device 112 or other sexual entertainment operations generally require viewers (e.g., the user 102a) to operate interface controls displayed in the user device 104a. As a result, the user 102a operations may be limited to finite operating areas. Further, the user 102a may feel discomfort for operating the sexual stimulation device 114a while simultaneously engaging in other sexual entertainment operations according to the user's 102a sexual preferences. In other words, managing the performance of sexual activities while operating interface controls (e.g., cameras, lighting, or interaction features) can be physically demanding and difficult. Furthermore, the lack of hands-free technology for controlling interaction features forces the viewers (i.e., the user 102a) to multitask in a distracting way. In some scenarios, operating the interface controls while distracted by the performance may lead to technical errors (such as accidentally stopping the content, live stream, or misconfiguring settings). Moreover, the user 102a may not operate normally and efficiently without observing the interface controls on the screen of the user device 104a, thus resulting in a poor sexual experience. Further, the need to shift focus between controls and performance may lead to interruptions or a lack of smooth flow in the content, reducing the viewer's (i.e., the user's 102a) experience. The present disclosure provides a technical solution to eliminate the operating limitations associated with the existing sexual entertainment systems and methods. Particularly, the present disclosure provides an efficient system and method to enable the user to seamlessly operate the sexual stimulation device and/or engage in related sexual entertainment activities. The sexual entertainment can be understood as a series of operations and interactions through System 120 that provide users with sexually related experiences and recreational activities to satisfy their needs and interests in sexuality. Among other things, the system 120 creates a sexually related entertainment experience for the user by associating target elements with various operational entities, utilizing interactions of hardware devices and software functions, and interactions between the user and the model user.

The system 120 may monitor the at least one target element and at least one parameter of the at least one target element in the real-time environment through the head-mounted display 116 of the user 102a. Some examples of the at least one target element include the sexual stimulation device 112 associated with the model user 106, the sexual stimulation device 114a associated with the user 102a, the user device 104a of the user 102a, the head-mounted display 116, body parts, and gestures performed by the body parts. In general, the at least one target element corresponds to a physical object present in a realistic environment or scene. The at least one parameter may include at least one of a timing parameter and a motion parameter.

Further, the system 120 determines at least one operation entity corresponding to the at least one target element of the at least one target element. Herein, the term 'the at least one operation entity' refers to a component, a function, or specific tasks within a component/system that performs a particular operation or a set of operations (i.e., the set of actions). The at least one operation entity (hereinafter interchangeably referred to as 'the operation entity' or the operation entities') may be related to sexual entertainment. In one embodiment, the at least one operation entity may be a hardware entity such as the sexual stimulation device 114a of the user, the sexual stimulation device 112 of the model user 106, the image capturing module 110, and the like. In another embodiment, the at least one operation entity may be a software entity such as a control instruction for operating the sexual stimulation device 114a or the sexual stimulation device 112, virtual tokens, the live broadcast platform 122, and the like. Thereafter, the system 120 is configured to generate a correlation between the at least one operation entity and the at least one target element. The correlation between the at least one operation entity and the at least one target element refers to the set of actions defined for the at least one operation entity based on the target element. Further, the at least one operation entity is configured to perform a set of actions defined corresponding to the at least one parameter associated with the at least one target element, thereby providing sexual entertainment to the user 102a associated with the head-mounted display 116. For example, the target element is determined to be a hand gesture of the user 102a. Hence, the set of actions is defined for the at least one operation entity such as the sexual stimulation device 112 based on the hand gesture of the user 102a. The operations associated with the system 120 to monitor the at least one target element, detect the at least one operation entity, and so on are further explained in detail with reference to FIG. 2. "The set of actions" refers to a set of actions defined based on a target element and its associated parameters in the user's interaction with the virtual environment. These actions are executed by the system 120 in order to provide a sexual entertainment experience. These sets of actions are defined for at least one operation entity, which may be a hardware entity, such as a user's sexual stimulation device, or a software entity, such as a control command, a virtual token, a live streaming platform, and the like. The following are some examples of possible "actions" that may trigger a system response based on a user's movement or interaction: Device Control Actions: If the target element is a user gesture, an action may be to control the operation of a sexually stimulating device based on the direction, speed, or duration of the gesture. Media content generation actions: the system may generate specific media content, such as animations or videos, that are synchronized with sexually relevant actions based on the user's gestures. Virtual Token Manipulation: The user's eye movements may be used to select virtual tokens and send them to the model in the live stream, which may affect the content of the live stream or the model's behavior. User Interface Actions: The user's gestures may be used to perform interactive commands such as switching the live streaming source of the current live streaming interface, scrolling the playlist, or locking the current view. Parameter Adjustment Actions: The user's gestures may be used to adjust parameters related to the operation of the sexual stimulation device, such as adjusting the intensity or frequency of vibration. Live environment control actions: User gestures may be used to control relevant elements of the live environment, such as the brightness of lights and the volume of music in the model user's live room. These sets of gestures are designed based on the user's physical interactions to provide an immersive experience and to enhance the user's sensory experience through simulated or augmented reality head-mounted display devices. The system 120 accomplishes this by monitoring target elements and associated parameters and translating them into action sets for operating entities.

The number and arrangement of systems, devices, and/or networks shown in FIG. 1 are provided as an example. There may be other systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices.

Figure 2:
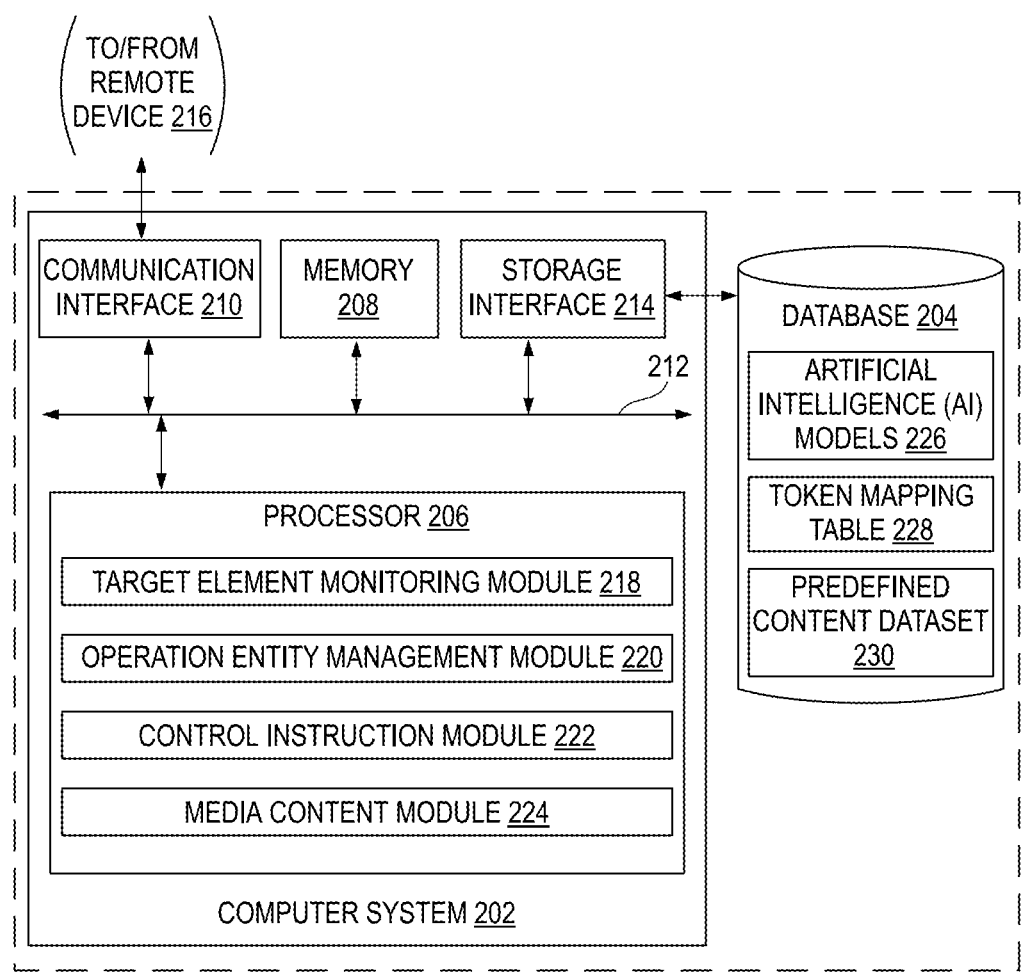
FIG. 2 illustrates a simplified block diagram of a system for rendering simulated environments to provide sexual entertainment based on monitoring target elements, in accordance with an embodiment of the present disclosure.

FIG. 2 illustrates a simplified block diagram of a system 200 for rendering simulated environments to provide sexual entertainment based on monitoring the target elements, in accordance with an embodiment of the present disclosure. Examples of the system 200 may include, but are not limited to, the system 120 as shown in FIG. 1. The system 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the live broadcast platform 122 and one or more components of the live broadcast platform 122. In addition, the database 204 is configured to store the at least one operation entity, a token mapping table 228, media content, predefined control instructions, one or more artificial intelligence (AI) models 226, and the like. The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the system 200, as described herein. In some embodiments, the memory 208 may be realized in the form of a database or cloud storage working in conjunction with the system 200, without deviating from the scope of the present disclosure.

The processor 206 is operatively coupled to the communication interface 210 such that the processor 206 is capable of communicating with a remote device 216 such as the user devices 104a-104c, the user terminal 108, the head-mounted display 116, or with any entity connected to the network 118 as shown in FIG. 1.

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

In one embodiment, the processor 206 includes a target element monitoring module 218, an operation entity management module 220, a control instruction module 222, and a media content module 224.

The target element monitoring module 218 includes suitable logic and/or interfaces to monitor the at least one target element (hereinafter interchangeably referred to as 'the target elements') and the at least one parameter (hereinafter interchangeably referred to as 'the parameters') associated with the target elements in the real-time environment through the head-mounted display 116 associated with a user (e.g., the user 102a). The target elements may include, but not limited to, the sexual stimulation device 112 associated with the model user 106, the sexual stimulation device 114a-114c, the user devices 104a-104c, the head-mounted display 116, the body parts (e.g., hand, head, eye, genitals, etc.), and the gestures of the body parts (e.g., hand gestures). Further, the parameters of the at least one target element may include the timing parameter and the motion parameter. The timing parameter involve time-dependent metrics of the target element during a particular activity or event. These parameters may include, but are not limited to, the following: Response time: the time interval between when a command is issued and when the target element begins to respond. Duration: the length of time the target element maintains a state or performs an action. Interval time: the time interval between two events or actions. Synchronization time: the point in time at which actions or events between different target elements are synchronized. For example, in a live streaming environment of adult content, the time parameters may include: a response time for the sexually stimulating device 112 to interact with the modeled user 106. A communication delay between the user devices 104a-104c and the sexual stimulation devices 114a-114c. The duration for a body part (e.g., hand, head, eyes, genitals, etc.) to perform a particular movement. The motion parameter relate to a measure of movement or action of a target element in space. These parameters may include, but are not limited to, the following: Velocity: the speed at which the target element is moving, either linear or angular. Acceleration: the rate of change of the target element's velocity. Displacement: the vector distance that the target element moves from one position to another. Trajectory: the path of the target element's movement. Angle: the rotation or tilt angle of the target element in space. Direction: the direction in which the target element is moving or pointing. For example, in a live streaming environment for adult content, motion parameters might include: the speed and acceleration of the motion of the sexually stimulating device 112. Displacement and trajectory of the user's gestures (e.g., hands, head, eyes, etc.). Angles and speeds of body parts of the modeled user 106 as they perform specific actions.

The operation entity management module 220 includes suitable logic and/or interfaces to determine the at least one operation entity (hereinafter interchangeably referred to as 'the operation entity' or 'the operation entities') corresponding to the at least one target element and the at least one parameter. As explained above, the at least one operation entity corresponds to sexual entertainment. Further, the operation entity management module 220 is configured to generate a correlation between the at least one operation entity and the at least one target element. The correlation between the at least one operation entity and the at least one target element refers to the set of actions defined for the at least one operation entity based on the target element. The at least one operation entity is configured to perform the set of actions defined corresponding to the at least one parameter associated with the at least one target element. Hence, enabling the operation entity to perform the set of actions corresponding to the parameters provides sexual entertainment to the user 102a associated with the head-mounted display 116. For example, the target element is determined to be a hand gesture of the user 102a. Hence, the set of actions is defined for the at least one operation entity such as the sexual stimulation device 112 based on the hand gesture of the user 102a.

In one example scenario, the target element monitoring module 218 is configured to monitor the at least one target element through the head-mounted display 116. Further, the target element monitoring module 218 monitors the motion parameter and the timing parameter associated with the at least one target element. For example, the user 102a wears the head-mounted display 116 to watch content (e.g., a live broadcast of the model user 106) rendered in the live broadcast platform 122. The model user 106 may perform sexual action using the sexual stimulation device 112. In this scenario, the head-mounted display 116 is configured to capture the body part (e.g., eye-ball tracking, fingers, head, feet, or genitals) of the user 102a. Herein, the body part of the user 102a corresponds to the at least one target element. For instance, the target element monitoring module 218 may determine the selection of the sexual stimulation device 112 based on tracking the positioning of the finger (i.e., the at least one target element) of the user 102a in a realistic environment. In this scenario, the sexual stimulation device 112 corresponds to at least one operation entity. Thereafter, the target element monitoring module 218 tracks the motion parameter of the fingers (e.g., oscillatory movement of the fingers) of the user 102a through the head-mounted display 116. Correspondingly, the operation entity management module 220 operates the sexual stimulation device 112 based on the oscillatory movement (i.e., the motion parameter) of the fingers of the user 102a. In other words, if the user 102a moves the fingers left and right, the operation entity management module 220 operates the sexual stimulation device 112 corresponding to the movement of the fingers of the user 102a to provide sexual stimulation action to the model user 106. Herein, the set of actions of the sexual stimulation device 112 is defined based on the movement of the fingers towards the left and right.

It is to be noted that the processor 206 (or the target element monitoring module 218) is configured to determine a set of parameters based on the motion parameter associated with the at least one target element (e.g., hand movement of the user 102a). The set of parameters may include, but limited to, speed, distance, frequency, amplitude, positional coordinates, operating duration, operating mode, and a type of sexual stimulation. Thereafter, the operation entity management module 220 controls the sexual stimulation device 112 associated with the model user 106 corresponding to the set of parameters determined based on the motion parameter of the hand movement/trajectory of the user 102a. Similarly, the operation entity management module 220 controls the sexual stimulation device 114a associated with the user 102a based on the set of parameters determined based on the motion parameter of the hand movement of the user 102a.

In another example scenario, the head-mounted display 116 of the user 102a is configured to render a sex toy in perspective or in the field of view of the head-mounted display 116. In this scenario, the head-mounted display 116 is configured to track the eyeball (i.e., the at least one target element) of the user 102a. For instance, the user 102a gazes at a functional part (e.g., stimulation part) of the sex toy rendered in the field of view for a preset period (e.g., 3 seconds). The target element monitoring module 218 tracks the timing parameter of the eyeball (i.e., the target element) while the user 102a gazes at the functional part of the sex toy. The target element monitoring module 218 triggers the operation entity management module 220 if the timing parameter of the eyeball of the user 102a matches the preset period of 3 seconds while the user 102a gazes at the functional part of the sex toy. Herein, the functional part of the sex toy corresponds to the at least one operation entity. To that effect, the operation entity management module 220 controls the functional part to operate corresponding to the function defined for the functional part. For example, the sex toy may be a male masturbator and the user 102a gazes at a male penis cup for the preset period of 3 seconds. In this scenario, the operation entity management module 220 operates the male penis cup to provide thrusting action. In addition, the target element module 218 may track the movement (i.e., the motion parameter) of the user's 102a hand or head or other body parts through the head-mounted display 116 upon selecting the operation entity (i.e., the functional part). In this scenario, the operation entity management module 220 controls the thrusting action of the functional part of the sex toy corresponding to the movement of the hand or head or other body parts of the user 102a.

Similarly, the target element monitoring module 218 may track the eyeball (i.e., the at least one target element) of the user 102a gazing at a control component of the sex toy through the head-mounted display 116. The target element monitoring module 218 triggers the operation entity management module 220 if the user 102a gazes at the control component for the preset period of 3 seconds (i.e., the timing parameter). To that effect, the operation entity management module 220 controls the function of the control component of the sex toy. For example, if the user 102a gazes at 'ON' button (i.e., the control component) of the sex toy for 3 seconds, the operation entity management module 220 activates the sex toy to provide stimulation (e.g., masturbation action). Herein, the functionality of the control component of the sex toy corresponds to the at least one operation entity.

In another example scenario, the user 102a wears the head-mounted display 116 to watch the content of the model user 106 being rendered on the live broadcast platform 122. In this scenario, the target element monitoring module 218 in conjunction with the head-mounted display 116 is configured to detect the at least one target element (e.g., the eyeball of the user 102a) while the user 102a is watching the content of the model user 106. Thereafter, the target element monitoring module 218 is configured to determine a type of the at least one target element based on implementing the one or more artificial intelligence (AI) models 226. The AI models 226 are trained with specific algorithms for detecting the type of the at least one target element. Typically, the AI models 226 are trained with a wide variety of target elements such as, but not limited to, the sexual stimulation devices, user devices/terminals, the head-mounted displays, the target objects, gestures, and the body parts. Further, the algorithms for training the AI models 226 may include, but not limited to, You Only Look Once (YOLO), Single Shot MultiBox Detector (SSD), Faster R-Convolutional Neural Network (CNN), Support Vector Machines (SVMs), and the like. Furthermore, the AI models 226 are configured to access the token mapping table 228 stored in the database 204. The token mapping table 228 typically includes predefined token values for each type of the at least target element and the at least one parameter. In an embodiment, the token values are predefined for each type of the at least target element and the at least one parameter by the user (e.g., the user 102a or the model user 106). In another embodiment, the token values are predefined for each type of the at least target element and the at least one parameter by the system 200.

Upon deployment of the trained AI models 226, the trained AI models 226 are configured to detect the type of the at least one target element. In one example scenario, the type of the at least one target element is a body part (e.g., the eyeball) of the user 102a. Thereafter, the target element monitoring module 218 monitors the at least one parameter of the eyeball of the user 102a through the head-mounted display 116. Further, the operation entity generation module 220 determines the at least one operation entity (i.e., token value) corresponding to the type of the at least one target element and the at least one parameter. For example, the user 102a may move the eyeball (i.e., the at least one target element) leftwards and rightwards 3 times (i.e., the at least one parameter). In this scenario, the operation entity management module 220 determines the token value corresponding to the eyeball (i.e., the at least one target element) movement towards left and right 3 times (i.e., the at least one parameter) from the token mapping table 228. In other words, the operation entity management module 220 compares the eyeball (i.e., the at least one target element)

movement towards left and right 3 times (i.e., the at least one parameter) with each entry of the token mapping table 228. Further, the operation entity management module 220 determines the token value corresponding to the eyeball (i.e., the at least one target element) movement towards left and right 3 times (i.e., the at least one parameter). The token value determined may be 3 tokens for the movement of the eyeball towards left and right 3 times. Thereafter, the virtual tokens corresponding to the determined token value may be rendered to the model user 106 performing the content on the live broadcast platform 122.

In a similar manner, the user 102a wears the head-mounted display 116 to watch the content rendered in the live broadcast platform 122. The target element monitoring module 218 determines the at least one target element to be gestures performed by the user 102a and further tracks the parameter of the gestures performed by the user 102a. For example, the gestures performed by the user 102a may be stretching out 3 fingers. In this scenario, the operation entity monitoring module 220 determines the operation entity (i.e., the token value) to be 3 tokens corresponding to the gestures (stretching out 3 fingers) performed by the user 102a. In another example scenario, the user 102a may perform a gesture of counting money (i.e., the at least one target element). In this scenario, the operation entity generation module 220 determines the token value to be 10 tokens for the gesture of counting money while watching the content. In addition, the target element monitoring module 218 may track the number of times the gesture of counting money is made. For example, the number of times the counting money gesture performed in the preset time (e.g., 10 seconds) is 5 times. In this scenario, the operation entity management module 220 determines the token value (i.e., the operation entity) to be 5 tokens.

In another example scenario, the user 102a may perform a gesture of throwing money (i.e., the at least one target element) while watching the content. In this scenario, the operation entity generation module 220 determines the token value to be 20 tokens for the gesture of throwing money. In another example scenario, the target element monitoring module 218 may determine the target element to be a body part (e.g., penis) of the user 102a. Further, the target element monitoring module 218 determines the parameter while the user 102a performs masturbation action using the penis. In this scenario, the operation entity management module 220 determines the token value (i.e., the operation entity) to be 30 tokens for the masturbation action performed using the penis.

In another example scenario, the user 102a may hold the sexual stimulation device 114a while watching the content of the model user 106 on the live broadcast platform 122. In this scenario, the target element monitoring module 218 identifies the gesture of holding the sexual stimulation device 114a by the user 102a as the target element through the head-mounted display 116. Further, the operation entity management module 220 determines the token value (i.e., the operation entity) corresponding to the gesture of holding the sexual stimulation device 114a.

In another example scenario, the user 102a may manipulate token elements rendered in the content of the model user 106. The target element monitoring module 218 tracks the at least one target element (e.g., eye gestures, hand, etc.) through the head-mounted display 116 to detect manipulation of the token elements. The operation entity monitoring module 220 determines the token value (i.e., the operation entity) corresponding to the token elements manipulated based on the influence of the at least one target element.

In another example scenario, the target element monitoring module 218 tracks at least one object in the room of the model user 106 performing the content through the head-mounted display 116. The user 102a may point at the at least one object using hand (i.e., the motion parameter) or gaze at the at least one object for the preset period of 3 seconds (i.e., the timing parameter). Herein the hand movement and the eye gaze of the user 102a pointing towards the at least one object in the room of the model user 106 corresponds to the at least one target element. In other words, the at least one object is identified in content being performed by the model user 106 based on monitoring the at least one target element (e.g., hand movement or eye gaze of the user 102a) through the head-mounted display 116 associated with the user 102a. For example, the at least one object may be a photo frame. In this scenario, the operation entity management module 220 may determine an object value (e.g., cost) of the photo frame using the AI models 226. The AI models 226 may implement image recognition technology to identify the type of the target element. Further, the AI models 226 perform contextual analysis of the photo frame (the target element) and provide actionable insights (i.e., the cost of the photo frame). In an embodiment, the operation entity management module 220 may perform networking inquiries to determine the token value. Thereafter, the operation entity management module 220 computes the token value corresponding to the object value of the at least one object (e.g., the photo frame) based at least on a predefined conversion value. For example, the object value of the photo frame may be 3 dollars and the predefined conversion value may be '1 token for 1 dollar'. Hence, the token value for the photo frame is determined to be 3 tokens. Further, the operation entity management module 220 may determine at least one operation entity including virtual tokens corresponding to the determined token value. Thereafter, the virtual tokens may be rendered to the model user 106 based on the token value determined corresponding to the object value of the at least one object (e.g., the photo frame).

In another example scenario, the target element monitoring module 218 is configured to monitor the parameter of the target element through the head-mounted display 116 while the user 102a views a plurality of content of the live broadcast platform 122. For example, the user 102a wears the head-mounted display 116 and views the plurality of content performed by the model user 106 through the live broadcast platform 122. In an embodiment, the plurality of content may be a live broadcast of the model user 106 stored in the live broadcast platform 122. In other words, the plurality of content stored in the live broadcast platform 122 may be rendered as playback windows. In another embodiment, the plurality of content may be the live broadcast of multiple model users. In another embodiment, the plurality of content may be sexual content. The plurality of content rendered in the live broadcast platform 122 may correspond to a home page of the live broadcast platform 122. The target element monitoring module 218 monitors the at least one target element to identify the content among the plurality of content being pointed by the user 102a. In one scenario, the target element monitoring module 218 identifies the content among the plurality of content in the live broadcast platform 122 based on detecting eye gaze (e.g., the at least one target element) of the user 102a at the content among the plurality of content for the preset period (e.g., 3 seconds). In another scenario, the target element monitoring module 218 identifies the content by tracking the at least one target element such as the user's 102a hand pointed at the content among the plurality of content through the head-mounted display 116.

Thereafter, the operation entity management module 220 determines the operation entity to be performed in the live broadcast platform 122 corresponding to the parameter of the target element. The operation entity may include one or more interactive commands to interact with the plurality of content of the live broadcast platform 122. For example, the operation entity management module 220 determines the operation entity based on the selection of the content among the plurality of content in the live broadcast platform 122. In particular, the operation entity management module 220 determines the one or more interactive commands as the operation entity based on the selection of the content among the plurality of content. The one or more interactive commands may include a switch command. In one scenario, the head-mounted display 116 may send a control signal to the browser (or the live broadcast platform 122) to instruct the browser to switch to the content selected based on monitoring the at least one target element and the at least one parameter of the at least one target element. In another scenario, the head-mounted display 116 may transmit the control signal appended with the switch command to the system 200. In this scenario, the operation entity management module 220 instructs the live broadcast platform 122 to execute the switch command (i.e., the operation entity). Hence, the user 102a may be rendered with the content in the field of view of the head-mounted display 116 by executing the switch command. In other words, a user interface rendering the plurality of content in the live broadcast platform 122 may be switched to a user interface of the content selected by the user 102a based on the inputs of the at least one target element as explained above.

In another example scenario, the user 102a wears the head-mounted display 116 and accesses the plurality of content through the live broadcast platform 122. The target element monitoring module 218 may detect a hand gesture of the user 102a or the direction of eyeball movement of the user 102a as the target element. Thereafter, the target element monitoring module 218 monitors the parameters corresponding to the hand gesture or the eyeball movement of the user 102a. For example, the user 102a may move the hand or the eyeball in a vertical direction. Further, the operation entity management module 220 determines the operation entity corresponding to the target element and the parameters of the target element (e.g., the hand gesture or the eyeball movement in the vertical direction). Specifically, the operation entity management module 220 determines the interactive commands as the operation entity corresponding to the hand gesture or the eyeball movement of the user 102a in the vertical direction. In this scenario, the interactive commands determined corresponding to the hand gesture or the eyeball movement of the user 102a in the vertical direction may be a scroll command.

In another example scenario, the target element monitoring module 218 detects through the head-mounted display 116 that the user's 102a hand moves downward or the user's 102a eye gaze reaches the bottom of the plurality of content rendered on the home page of the live broadcast platform 122. Herein, the at least one target element and the at least one parameter of the at least one target element are determined by the head-mounted display 116 of the user 102a based on tracking the user's 102a hand movement and or eye gaze towards the bottom of the home page. In this scenario, the operation entity management module 220 determines the interactive commands to either switch to the subsequent content on the home page or scroll downward the home page in the live broadcast platform 122. Additionally, the interactive commands may include a return to the main page, a return to the previous page, a lock command to freeze the user interface rendered in the live broadcast platform 122, and the like.

In some scenarios, the gestures may be predefined for the live broadcast platform 122. For example, the gestures include snapping the fingers, twisting of hand, and the like. In this scenario, the target element monitoring module 218 detects the predefined gestures (performed by the user 102a as the target element and the parameters of the target element through the head-mounted display 116. Thereafter, the operation entity management module 220 detects the interactive commands as the operation entity corresponding to the predefined gestures (i.e., the target element and the parameters) performed by the user 102a. In one example, for the predefined gesture of snapping the fingers, the switch command is rendered as the operation entity. In another example, for the predefined gesture of hand twisting (similar to twisting a key to lock a door), the lock command is rendered as the operation entity.

The control instruction module 222 includes suitable logic and/or interfaces to generate a control instruction as the operation entity based on identifying a sexual stimulation device rendered in content rendered on the live broadcast platform 122. In one example scenario, the user 102a wears the head-mounted display 116 and watches the content on the live broadcast platform 122. The content may be performed by the model user 106. Additionally, the content may be rendered with the at least one object such as sex toys. The sex toys rendered in the content may be a virtual representation of the sexual stimulation device 112 associated with the model user 106. In this scenario, the target element monitoring module 218 monitors the target element and the parameters of the target element to determine the at least one object in the content of the model user 106 as explained above. For instance, the target element monitoring module 218 monitors the eye gaze or hand position of the user 102a (i.e., the target element and the parameters of the target element) through the head-mounted display 116 to detect the at least one object. Thereafter, the control instruction module 220 generates the control instruction based on the at least one object selected based on tracking the target element and the parameters of the target element. In an embodiment, the control instruction may be generated by the live broadcast platform 122 based on the selection of the at least one object by the user 102a. In another embodiment, the control instruction may be predefined in the live broadcast platform 122 for the at least one object. Further, the processor 206 is configured to transmit the control instruction to at least the user terminal 108 of the model user 106. The user terminal 108 further operates the sexual stimulation device 112 corresponding to the control instruction. In addition, the processor 206 transmits the control instruction to the user device 104a of the user 102a for controlling the sexual stimulation device 114a of the user 102a.

In another example scenario, the at least one object (e.g., the sexual stimulation device 112) may be controlled corresponding to the user's 102a eyeball movement or hand gestures to perform the sexual stimulation action on the model user 106. For example, if the user's 102a hand moves side-to-side in a reciprocal manner, the sexual stimulation device 112 (or the virtual representation of the sexual stimulation device 112) is controlled to perform a thrusting action corresponding to the hand movement. Herein, the user's 102a eyeball movement or the hand gestures in a reciprocal manner corresponds to the at least one target element. Further, the parameters of the least one target element are determined based on the eyeball movement or the hand gestures as explained above.

Additionally, the user 102*a* may provide the virtual tokens to the model user 106 performing the content on the live broadcast platform 122. In this scenario, the operation entity management module 220 is configured to determine the at least one operation entity in the content of the model user 106 being rendered by the live broadcast platform 122. The at least one operation entity is determined based on the receipt of the virtual tokens of a predefined value by the model user 106. For example, the at least one operation entity may include the image capturing module 110, a lamp, and a music player present in the room of the model user 106. The at least one operation entity may be determined based on tracking the at least one target element associated with the user 102*a* through the head-mounted display 116. Further, the user 102*a* may provide the virtual tokens of the predefined value. In this scenario, the operation entity management module 220 may control the at least one operation entity to perform the set of actions based on the virtual tokens provided by the user 102*a* to the model user 106 performing the content on the live broadcast platform 122. In an embodiment, the set of actions may be predefined for each of the at least one operation entity. In another embodiment, the user 102*a* may define the set of actions to control the target object upon providing the virtual tokens of the predefined value. In one example, if the user 102*a* provides the model user 106 with the virtual tokens of the predefined value (e.g., 10 virtual tokens), the operation entity management module 220 may control the image capturing module 110 (i.e., the at least one operation entity) to focus on the chest of the model user 106 for 10 seconds. In another example, if the user 102*a* provides the model user 106 with the virtual tokens of the predefined value (e.g., 20 virtual tokens), the operation entity management module 220 may control the music player (i.e., the at least one operation entity) to play erotic sounds for 10 seconds.

Further, the control instruction module 222 operate a control instruction tool based on monitoring the at least one target element and the at least one parameter of the at least one target element. The control instruction module 222 may access the one or more artificial intelligence (AI) models 226 to generate the control instruction, operate the control instruction tool, and the like. The AI models 226 may include generative AI models. Some examples of the generative AI models may include Transformers, Generative Adversarial Networks (GANs), Recurrent Neural Networks (RNNs), and the like. Further, the generative AI models may be trained with training data to generate the control instruction. The training data may include a gesture dataset (e.g., eye movement, hand gesture, head gesture, genital movement, etc.) and a labeled dataset of control parameters. The following are some training data types:

1. Gesture datasets: Gesture datasets are the basis for training the generative AI models. These datasets typically contain samples of a variety of gestures including, but not limited to, finger flexion, extension, movement, etc. These datasets can be presented as image sequences (e.g., a hand gesture). These datasets can be in the form of image sequences (e.g., video frames) or sensor data (e.g., accelerometer, gyroscope data). Among other things, the image sequence data contains video or still images of the user as he or she performs different gestures. This data is used to train a convolutional neural network (CNN)-based model to extract spatial features of the gestures. Further, the sensor data may include data collected by accelerometer and gyroscope sensors, which reflect the dynamics of gestures and are suitable for training gesture recognition systems based on the AI models 226 such as recurrent neural networks (RNNs) or LSTMs.

2. Annotated data/Labeled dataset for control parameters: annotated data refers to the labeling or annotation of each sample in a gesture dataset to indicate its corresponding control parameter. As an example, in gesture category annotation, each gesture sample is assigned a category label, such as 'forward', 'backward', 'left turn', 'right turn', 'speed', 'angle', etc. These labels correspond to the control parameters.

In one example scenario, the user 102*a* wears the head-mounted display 116 and performs the hand gesture. The target element monitoring module 218 monitors the hand gesture (i.e., the target element), and the motion and timing parameters of the hand gesture of the user 102*a*. The control instruction module 222 determines a set of control parameters based on monitoring the at least one target element and the at least one parameter i.e., the hand gesture of the user 102*a*, and the motion and timing parameters of the hand gesture of the user 102*a*. Thereafter, the control instruction module 222 operates a control instruction tool to generate a control instruction by appending the set of control parameters. It is to be noted that operating the control instruction tool based on the target element and the parameters of the target element (e.g., the hand gesture) results in the generation of the control instruction. The set of control parameters may include, but not limited to, an operating intensity and an operating duration. The set of control parameters corresponds to may be determined based on the motion trajectory of the user's 102*a* hand. For example, if the motion trajectory of the hand is in a relatively high position relative to the horizontal plane at a certain point, the operating intensity is relatively high. Further, the control instruction module 222 generates the control instruction by appending the set of control parameters. The control instruction may be configured to control the sexual stimulation device 112 of the model user 106 and/or the sexual stimulation device 114*a* of the user 102*a*. As an example, "Control instruction tool" means a system or software component operated by a control instruction module 222 that generates, edits (e.g., deletes, modifies, adds, etc.), or adjusts control instructions based on monitoring at least one target element and its associated parameters. This tool may be utilizing Artificial Intelligence (AI) models 226, which may include generative AI models such as transformers, Generative Adversarial Networks (GANs), Recurrent Neural Networks (RNNs), and the like, to process the training data and generate, edit, or adjust the control instructions.

In an embodiment, the user 102*a* may modify the control instruction by modifying the hand gesture. In this scenario, the target element monitoring module 218 monitors the modification of the hand gesture (i.e., the target element and the parameters of the target element) through the head-mounted display 116. Thereafter, the control instruction module 222 adjusts the control instruction corresponding to the modified hand gesture of the user 102*a*. Further, the control instruction module 222 determines the set of control parameters corresponding to the modified hand gesture of the user 102*a*. In this scenario, the modified hand gestures may be referred to as at least one modified parameter associated with the at least one target element.

The media content module 224 includes suitable logic and/or interfaces to generate the media content as the at least one operation entity corresponding to the at least one target element associated with the at least one target element. The media content corresponding to the at least one parameter of the at least one target element is determined based at least on a predefined content dataset 230. In other words, the media content may be pre-configured with a mapping relationship between the target element and the parameters of the target element and the media content. The predefined content dataset 230 may be utilized to train the AI models 226 to determine the media content corresponding to the target element and the operating parameters. The media content may include at least sound, pictures, text, and video, which may be configured to provide the user 102a with sexual entertainment. In an embodiment, the media content module 224 may implement the AI models 226 to automatically generate corresponding content based on the parameters of the target element.

In one example, the user 102a wears the head-mounted display 116 and views the content of the model user 106 on the live broadcast platform 122. In this scenario, the target element monitoring module 218 is configured to detect the hand gesture (e.g., waving gesture) of the user 102a as the target element and track the parameters of the hand gesture of the user 102a. The media content module 224 generates the media content, for example, the swinging of a whip hitting the buttocks of the model user 106 corresponding to the hand gesture of the user 102a and the motion trajectory of the hand gesture of the user 102a. Thereafter, the operation entity management module 220 renders the media content as the operation entity in the content to provide a sexual experience to the user 102a. Additionally, the media content module 224 may generate a sound effect of the whip hitting the buttocks of the model user 106 based on the hand gesture of the user 102a. The media content including the animation of the whip hitting the buttocks of the model user 102a and the corresponding sound effect is rendered to the user 102a through the head-mounted display 116 to provide sexual entertainment. In an embodiment, the media content module 224 may be configured to generate the control instruction to control the sexual stimulation device 112 of the model user 106 performing the content.

Figure 3A:
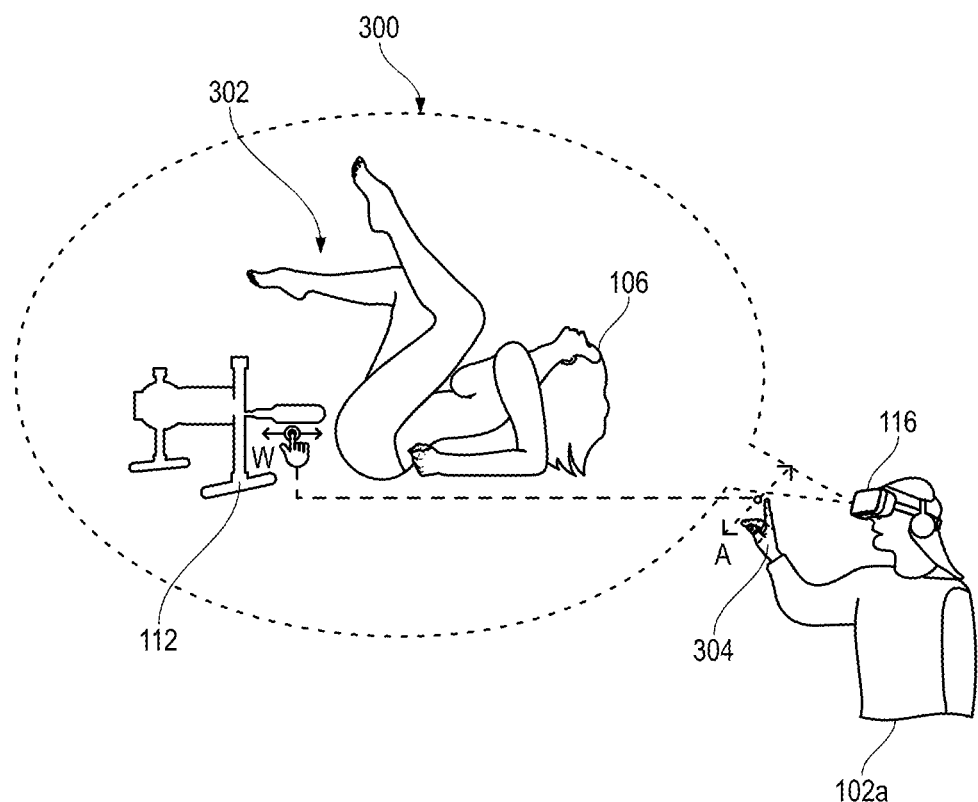
FIG. 3A illustrates an example scenario of a mixed reality (MR) environment rendered by a head-mounted display to a user for controlling a sexual stimulation device of a model user, in accordance with an embodiment of the present disclosure.

FIG. 3A illustrates an example scenario of a mixed reality (MR) environment 300 rendered by the head-mounted display 116 to the user 102a for controlling the sexual stimulation device 112 of the model user 106, in accordance with an embodiment of the present disclosure. The MR environment 300 is depicted to include content 302 being performed by the model user 106. As shown, the user 102a views the content 302 rendered in the MR environment 300 through the head-mounted display 116. The model user 106 may perform sexual action using the sexual stimulation device 112. In this scenario, the head-mounted display 116 is configured to capture a body part 304 (e.g., fingers) of the user 102a. Herein, the body part 304 of the user 102a corresponds to the at least one target element. For instance, the target element monitoring module 218 may determine the selection of the sexual stimulation device 112 based on tracking the positioning of the body part 304 of the user 102a in a realistic environment. In this scenario, the sexual stimulation device 112 corresponds to at least one operation entity. The user 102a may move the fingers (i.e., the body part 304) in a reciprocal manner. For illustration purposes, the movement of the fingers (i.e., the body part 304) is represented using a directional arrow 'A'. In this scenario, the target element monitoring module 218 tracks the motion parameter of the fingers (i.e., the body part 304) through the head-mounted display 116. Correspondingly, the operation entity management module 220 controls the sexual stimulation device 112 based on the movement (i.e., the motion parameter) of the fingers (i.e., the body part 304), thereby providing sexual entertainment to the user 102a. For illustration purposes, the operation of the sexual stimulation device 112 based on the movement of the fingers (i.e., the body part 304) is represented using a directional arrow 'W'. The sexual action performed by the sexual stimulation device includes at least one of sliding friction, vibration, oscillation, pressure, bending, expansion, contraction, and spraying of fluid.

Figure 3B:
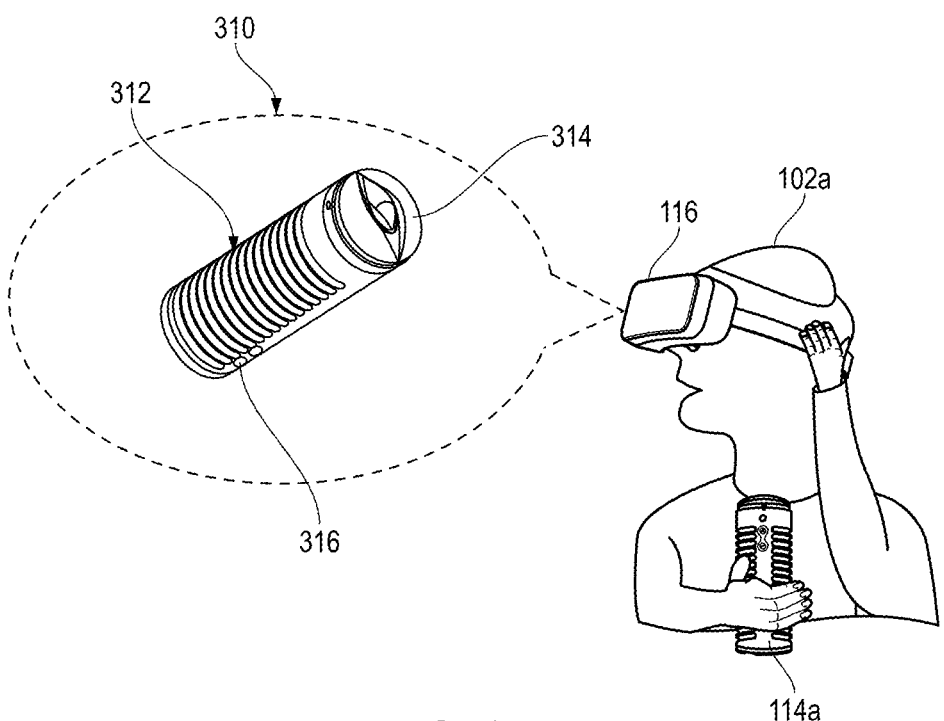
FIG. 3B illustrates an example scenario of a mixed reality (MR) environment rendered by the head-mounted display to the user for controlling the sexual stimulation device, in accordance with an embodiment of the present disclosure.

FIG. 3B illustrates an example scenario of a mixed reality (MR) environment 310 rendered by the head-mounted display 116 to the user 102a for controlling a sexual stimulation device, in accordance with an embodiment of the present disclosure. As shown, the head-mounted display 116 renders a sex toy 312 in the MR environment 310. For example, the sex toy 312 is a male masturbator. Further, the sex toy 312 may be a virtual representation of the sexual stimulation device 114a of the user 102a. In this scenario, the head-mounted display 116 is configured to track the eyeball (i.e., the target element) of the user 102a. For instance, the user 102a gazes at a functional part 314 (e.g., stimulation part) of the sex toy 312 rendered for the preset period (e.g., 3 seconds). The target element monitoring module 218 tracks the timing parameter of the eyeball (i.e., the target element) while the user 102a gazes at the functional part 314 of the sex toy 312. Further, the target element monitoring module 218 triggers the operation entity management module 220 if the timing parameter of the eyeball of the user 102a matches the preset period of 3 seconds while the user 102a gazes at the functional part 314 of the sex toy 312. Herein, the functional part 314 of the sex toy 312 corresponds to the at least one operation entity. To that effect, the operation entity management module 220 controls the functional part 312 (e.g., the stimulation part) to operate corresponding to the function defined for the functional part 312. The function defined for the functional part 312 may be reciprocatory motion.

Additionally, the target element monitoring module 218 may track the eyeball (i.e., the target element) of the user 102a gazing at a control component 316 of the sex toy 312 rendered in the MR environment 310 through the head-mounted display 116. The target element monitoring module 218 triggers the operation entity management module 220 if the user 102a gazes at the control component 316 for the preset period of 3 seconds (i.e., the timing parameter). Herein, the control component 316 corresponds to the at least one operation entity. Thus, the operation entity management module 220 controls the function of the control component 316 of the sex toy 312 in the MR environment 310. For example, if the user 102a gazes at 'ON' button (i.e., the control component 316) of the sex toy 312 for 3 seconds, the operation entity management module 220 activates the sex toy 312 to provide stimulation (e.g., thrusting action). In an embodiment, the target element monitoring module 218 may track the control component 316 and the functional part 314 of the sexual stimulation device 114a in the realistic environment through the head-mounted display 116.

Figure 3C:
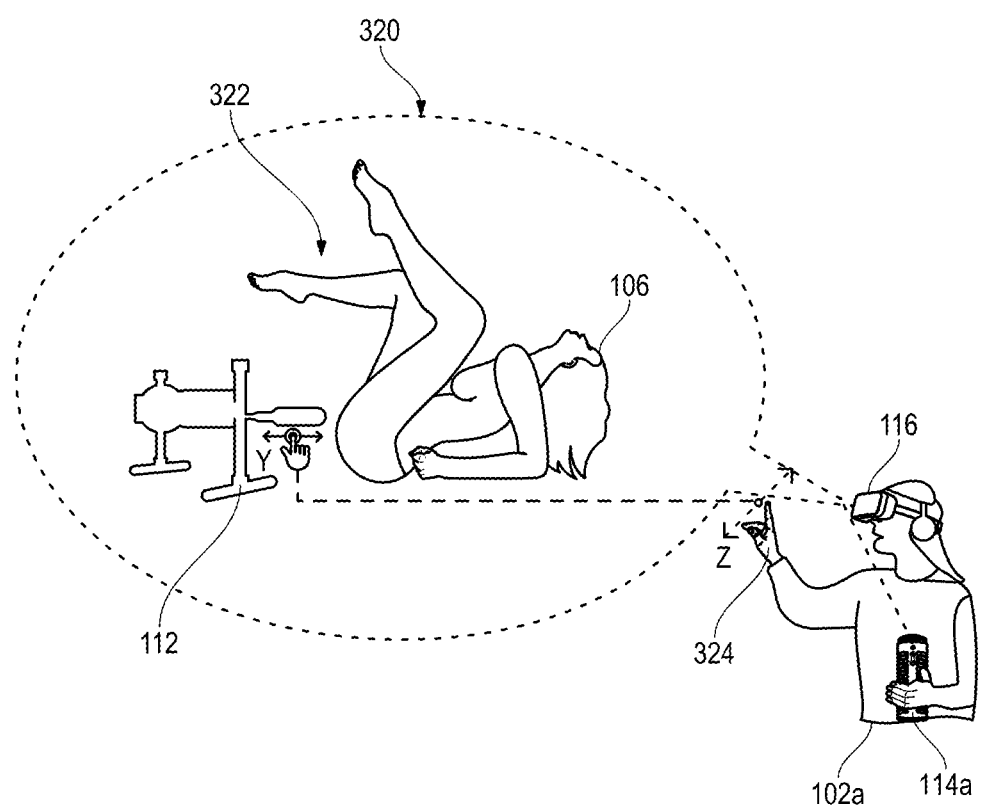
FIG. 3C illustrates an example scenario of a mixed reality (MR) environment depicting the controlling of at least one operation entity based on at least one target element, in accordance with an embodiment of the present disclosure.

FIG. 3C illustrates an example scenario of a mixed reality (MR) environment 320 depicting the controlling of the at least one operation entity based on the at least one target element, in accordance with an embodiment of the present disclosure. The MR environment 320 is depicted to include content 322 being performed by the model user 106. As shown, the user 102a views the content 322 rendered in the MR environment 320 through the head-mounted display 116. The model user 106 may perform sexual action using the sexual stimulation device 112. In this scenario, the head-mounted display 116 is configured to monitor a first target element of the at least one target element of the user 102a. Herein, the first target element may include an eye gaze of the user 102a on an object. For example, the object may include the sexual stimulation device 114a of the user 102a. For illustration purposes, the eye gaze of the user 102a of the head-mounted display 116 on the sexual stimulation device 114a is depicted using a dashed line connecting the head-mounted display 116 and the sexual stimulation device 114a. In this scenario, the operation entity management module 220 determines the at least one operation entity (e.g., the sexual stimulation device 112) corresponding to the eye gaze (i.e., the first target element) of the user 102a on the sexual stimulation device 114a. Further, the head-mounted display 116 may monitor a second target element of the at least one target element and a motion parameter of the second target element. For example, the second target element may include a body part 324 (e.g., fingers) of the user 102a and trajectory (i.e., the motion parameter) of the body part 324. The trajectory of the fingers (i.e., the body part 324) may be a reciprocal movement. For illustration purposes, the trajectory of the fingers (i.e., the body part 324) is represented using a directional arrow 'Z'. In this scenario, the target element monitoring module 218 tracks the motion parameter of the fingers (i.e., the body part 324) through the head-mounted display 116. In addition, the target element monitoring module 218 may determine a set of parameters for controlling the at least one operation entity. The set of parameters is determined based at least on monitoring the second target element (i.e., the body part 324) and the motion parameter associated with the second target element (i.e., the body part 324). The set of parameters may include speed, distance, frequency, amplitude, positional coordinates, operating duration, operating mode, and a type of sexual stimulation. Correspondingly, the operation entity management module 220 controls the sexual stimulation device 112 based on the movement (i.e., the motion parameter) of the fingers (i.e., the body part 324), thereby providing sexual entertainment to the user 102a. In other words, the sexual stimulation device 112 of the model user 106 may be operated based on the set of parameters determined based on the motion parameter associated with the second target element. For illustration purposes, the operation of the sexual stimulation device 112 based on the movement of the fingers (i.e., the body part 324) is represented using a directional arrow 'Y'. In addition, the sexual stimulation device 114a of the user 102a may be operated based on the set of parameters determined based on the motion parameter associated with the second target element. Typically, the control instruction module 222 may generate a control instruction based on the set of parameters to operate the sexual stimulation device 114a of the user 102a.

Figure 4A:
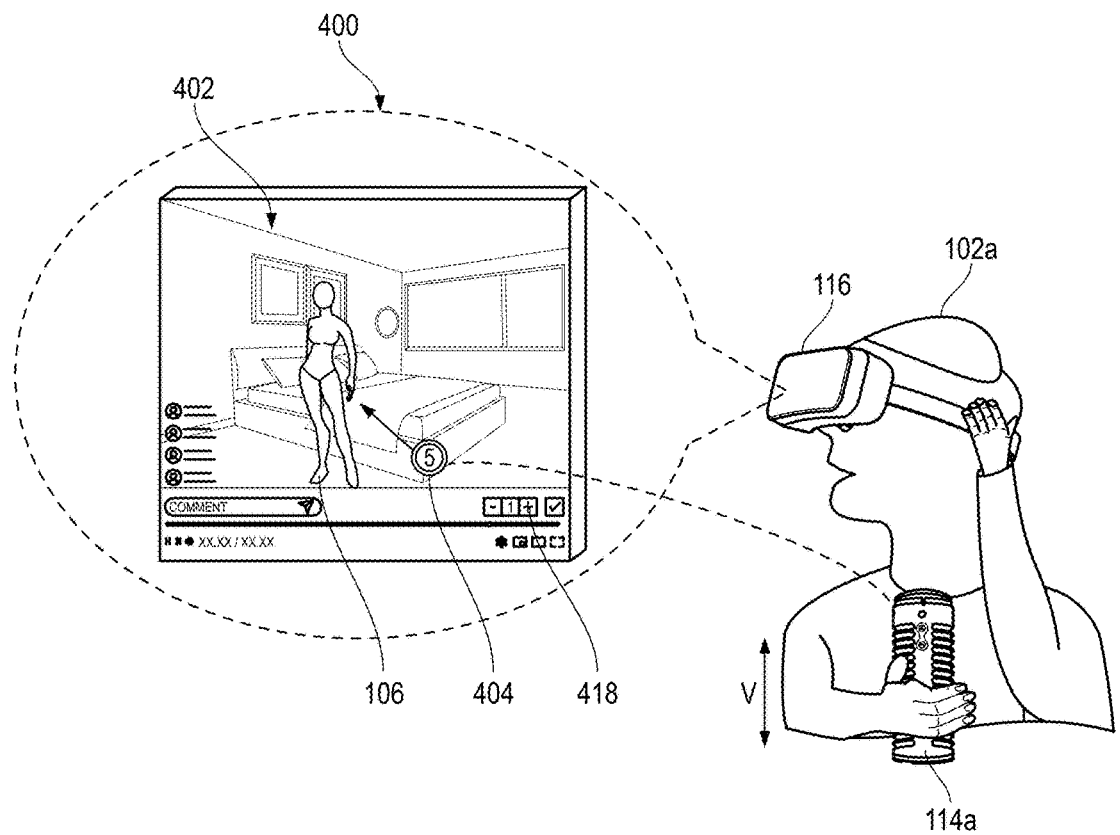
FIGS. 4A, 4B, and 4C illustrate an example scenario of a mixed reality (MR) environment depicting the rendering of virtual tokens to the model user or the user, in accordance with an embodiment of the present disclosure.

FIG. 4A illustrates an example scenario of a mixed reality (MR) environment 400 depicting a live broadcast of the model user 106 rendered through the head-mounted display 116, in accordance with an embodiment of the present disclosure. As shown, the user 102a wears the head-mounted display 116 to watch content 402 of the model user 106 on the live broadcast platform 122 rendered in the MR environment 400. In this scenario, the target element monitoring module 218 in conjunction with the head-mounted display 116 is configured to detect the at least one target element and the parameters of the target element while the user 102a is watching the content 402 rendered in the MR environment 400. Thereafter, the target element monitoring module 218 is configured to determine the type of the at least one target element based on implementing the artificial intelligence (AI) models 226. In this scenario, the sexual stimulation device 114a of the user 102a is identified as the target element by the target element monitoring module 218 through the head-mounted display 116. Further, the user 102a may operate the sexual stimulation device 114a in a vertical direction (exemplarily represented as 'V'). The target element monitoring module 218 monitors the parameters of the sexual stimulation device 114a while the sexual stimulation device 114a operates in the vertical direction 'V' (i.e., to-and-fro motion). Thereafter, the operation entity management module 220 determines the at least one operation entity corresponding to the movement of the sexual stimulation device 114a in the vertical direction 'V' based at least on the token mapping table 228. The at least one operation entity may be a token value determined corresponding to the movement of the sexual stimulation device 114a in the vertical direction 'V'. For example, the user 102a may operate the sexual stimulation device 114a in the vertical direction 'V' about 5 times. The operation entity management module 220 determines the token value to be 5 tokens for the movement of the sexual stimulation device 114a in the vertical direction 'V' about 5 times. Further, the virtual tokens 404 are rendered to the model user 106 or the user 102a corresponding to the determined token value.

Figure 4B:
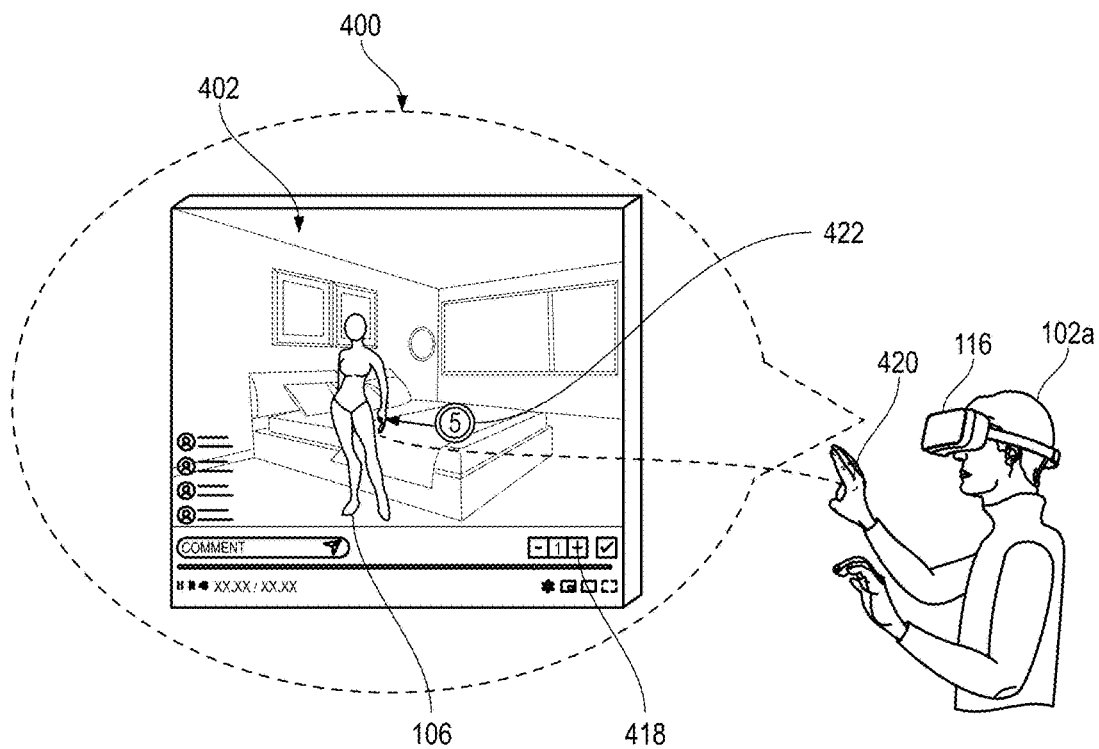

Referring to FIG. 4B, the user 102a wears the head-mounted display 116 to watch the content 402 on the live broadcast platform 122. The target element monitoring module 218 determines the at least one target element to be gestures 420 performed by the user 102a and further tracks the parameter of the gestures 420 performed by the user 102a. For example, the gestures 420 performed by the user 102a may be stretching out 3 fingers. In this scenario, the operation entity monitoring module 220 determines an operation entity 422 based on the gestures 420 performed by the user 102a. The operation entity 422 corresponds to the token value. For example, the token value is determined to be 5 tokens corresponding to the gestures 420 of stretching out 3 fingers. The operation entity management module 220 renders the operation entity 422 (i.e., 5 virtual tokens) to the model user 106 in the MR environment 400.

Additionally, the target element rendering module 218 may track the target element (e.g., eye gestures, hand gestures, etc.) to manipulate token elements 418 rendered in the content of the model user 106. The operation entity monitoring module 220 determines the token value (i.e., the operation entity) corresponding to the token elements 418 manipulated by the user 102a. For example, the token value determined initially may be 5 tokens, and the user 102a may adjust the token value to 10 tokens by modifying the hand gestures (e.g., the target element) to manipulate the token elements 418.

Figure 4C:
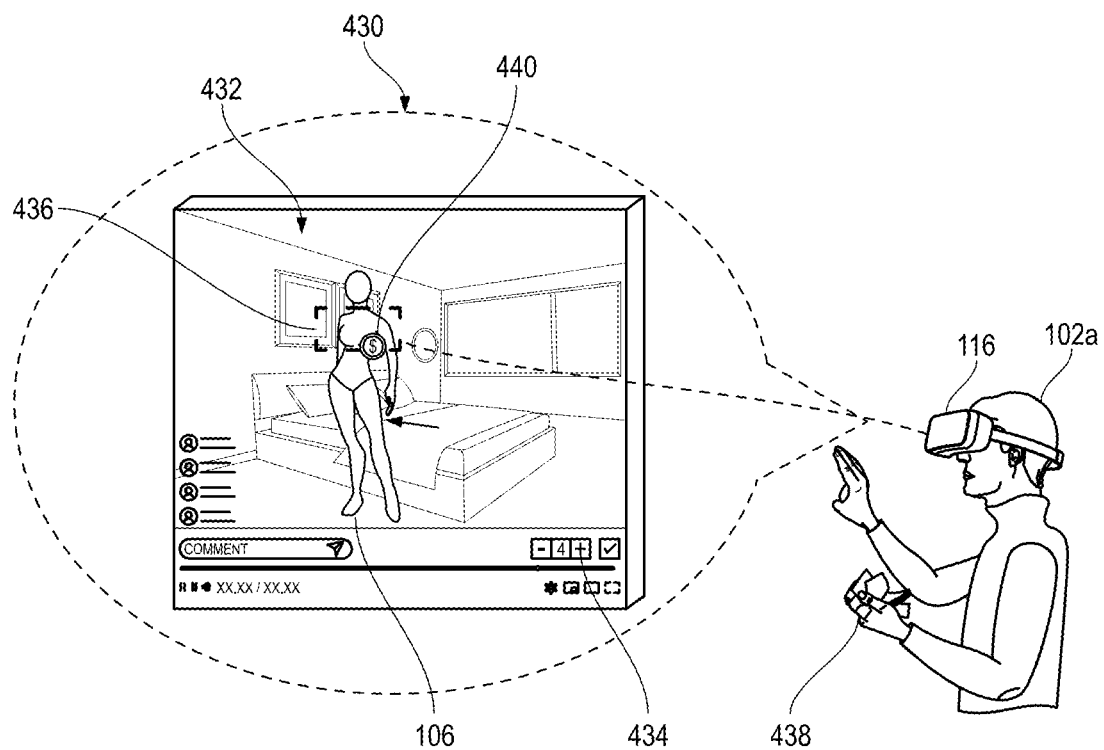

FIG. 4C illustrates an example scenario of a mixed reality (MR) environment 430 depicting the rendering of virtual tokens based on monitoring the at least one target element, in accordance with an embodiment of the present disclosure. The MR environment 430 is depicted to include content 432 being performed by the model user 106. As shown, the user 102a views the content 432 rendered in the MR environment 430 through the head-mounted display 116. In this scenario, the head-mounted display 116 is configured to monitor a first target element of the at least one target element of the user 102a and at least one parameter (such as the motion parameter and the timing parameter) of the first target element. Herein, the first target element may include an eye gaze of the user 102a. In this scenario, the target element monitoring module 218 may determine a token target 436 based on the eye gaze of the user 102a. For example, user's 102a eye gaze may be on the chest area of model user 106. Thus, the chest area of the model user 106 is determined as the token target 436. In this scenario, the operation entity management module 220 determines at least one operation entity 434 upon determining the token target 436. The at least one operation entity 434 corresponds to a token rendering tool. Further, the head-mounted display 116 may monitor a second target element of the at least one target element and a motion parameter of the second target element. For example, the second target element may include a body part 438 (e.g., fingers) of the user 102a and trajectory (i.e., the motion parameter) of the body part 438. The user 102a may perform a gesture of counting money using the fingers (i.e., the body part 438). The operation entity management module 220 determines a token parameter associated with the at least one operation entity 434. The token parameter is determined based on monitoring the second target element (i.e., the body part 438) and the motion parameter of the second target element (i.e., movement of the body part 438 such as the fingers). Thereafter, the operation entity management module 220 triggers the token rendering tool (i.e., the at least one operation entity 434) to execute the token parameter for providing virtual tokens 440 on the token target 436. For example, if the user 102a makes the gesture of counting the money using the fingers (i.e., the body part 438) 4 times, the token parameter is determined to be 4. In this scenario, the token rendering tool (i.e., the at least one operation entity 434) is operated to provide 4 virtual tokens (i.e., the virtual tokens 440) on the token target 436. This enables the user 102a to reward the model user 106, thereby transferring the user's virtual tokens from the user 102a's platform account to the model user 106's platform account.

Figure 5:
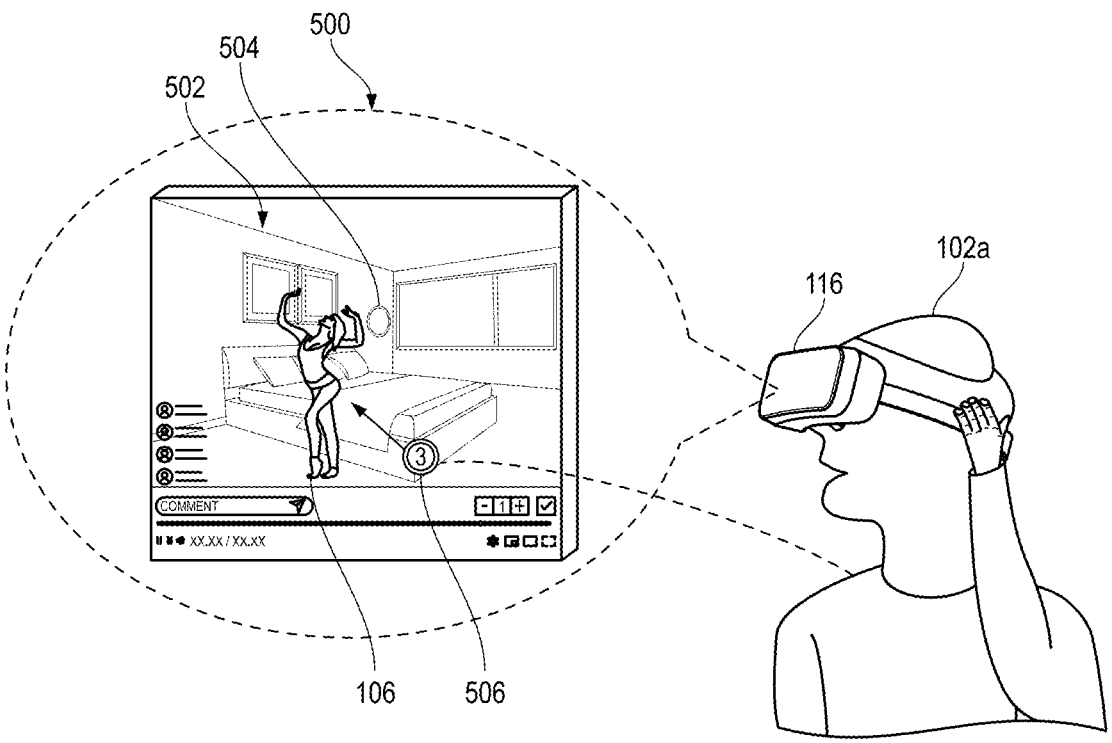
FIG. 5 illustrates an example scenario of a mixed reality (MR) environment depicting the rendering of the virtual tokens in the live broadcast of the model user based on detecting at least one object, in accordance with an embodiment of the present disclosure.

FIG. 5 illustrates an example scenario of a mixed reality (MR) environment 500 depicting the rendering of virtual tokens in a live broadcast of the model user 106 based on at least one object, in accordance with an embodiment of the present disclosure. As shown, the user 102a wears the head-mounted display 116 to watch content 502 of the model user 106 on the live broadcast platform 122. In this scenario, the target element monitoring module 218 tracks the at least one target element and the at least one parameter of the at least one target element through the head-mounted display 116 to determine at least one object (see, 504) in the room of the model user 106 performing the content 502. In an example, the at least one target element and the at least one parameter of the at least one target element include eye of the user 102a gazing at the at least one object 504 for the predefined time, respectively. In another example, the user 102a may point at the at least one object 504 using hand (i.e., the motion parameter). The at least one object 504 may be a photo frame (as shown in FIG. 5). The operation entity management module 220 may determine the object value (e.g., cost) of the photo frame (i.e., the at least one object 504) using the AI models 226. Further, the AI models 226 perform contextual analysis of the photo frame (the at least one object 504) and provides actionable insights (i.e., the cost of the photo frame). Thereafter, the operation entity management module 220 computes the token value corresponding to the object value of the at least one object 504 (e.g., the photo frame) based at least on the predefined conversion value. For example, the object value of the photo frame (i.e., the at least one object 504) may be 3 dollars and the predefined conversion value may be '1 token for 1 dollar'. Hence, the token value for the photo frame (i.e., the at least one object 504) is determined to be 3 tokens. Further, the operation entity management module 220 renders at least one operation entity 506 to the model user 106 or the user 102a in the MR environment 500 upon computing the token value for the at least one object 504. Herein, the at least one operation entity 506 corresponds to the virtual tokens. In other words, the model user 106 is rendered with 3 virtual tokens based on the detection of the photo frame (or the at least one object 504) in the content 502.

Figure 6A:
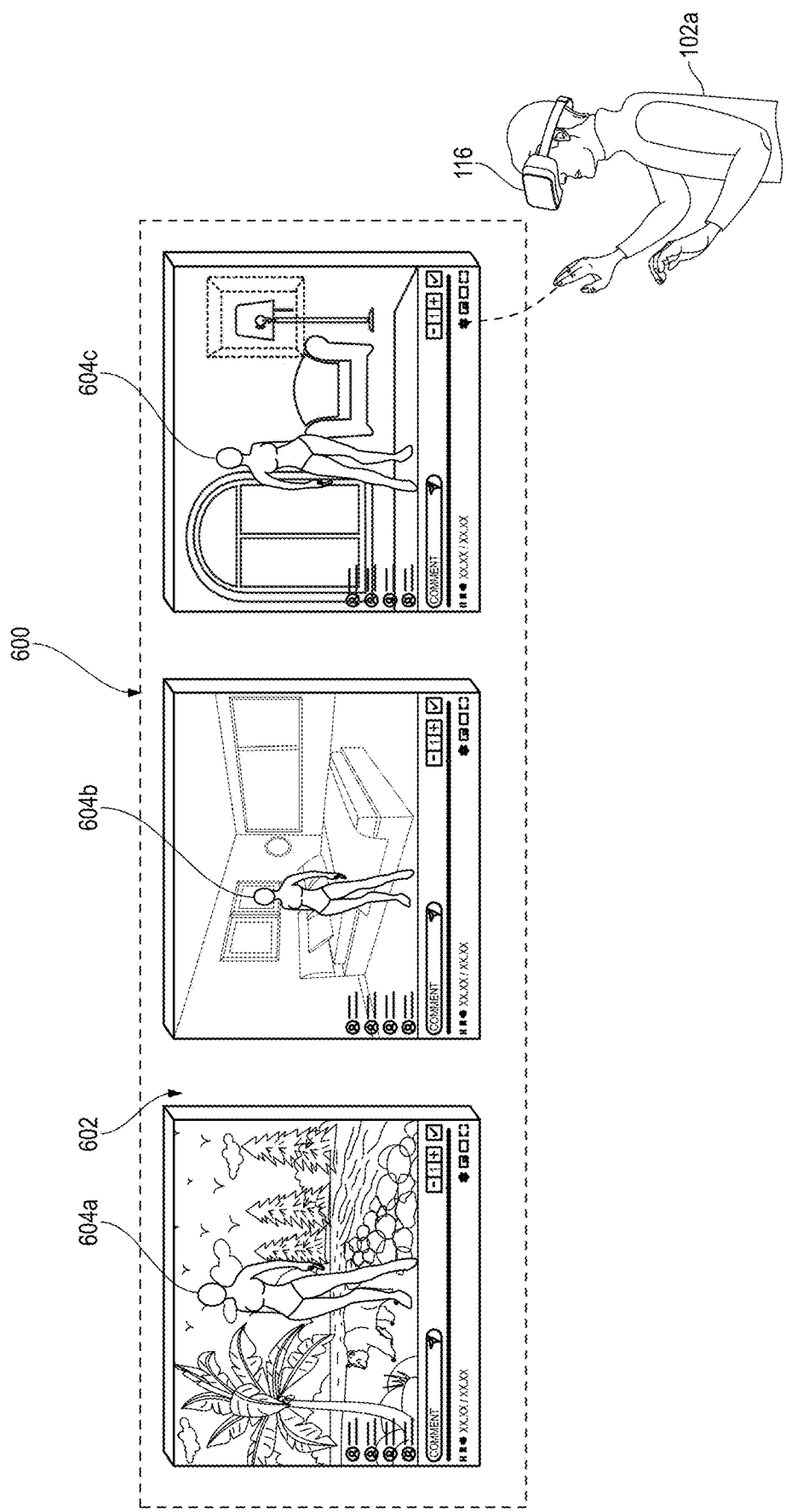
FIGS. 6A, 6B, and 6C illustrate an example scenario of a mixed reality (MR) environment depicting the rendering of interactive commands, in accordance with an embodiment of the present disclosure.

FIG. 6A illustrates an example scenario of a mixed reality (MR) environment 600 depicting a plurality of content 602 of the live broadcast platform 122, in accordance with an embodiment of the present disclosure. As shown, the user 102a wears the head-mounted display 116 to view the plurality of content 602 of the live broadcast platform 122. In this scenario, the target element monitoring module 218 is configured to monitor the parameter of the target element while the user 102a views the plurality of content 602 of the live broadcast platform 122 through the head-mounted display 116. The plurality of content 602 may be performed by a model user 604a, a model user 604b, and a model user 604c. The model users 604a-604c are an example of the model user 106. The plurality of content 602 may be live broadcast of the model users 604a-604c or playback windows performed by the model users 604a-604c. The plurality of content 602 rendered in MR environment 600 may correspond to a home page of the live broadcast platform 122.

Figure 6B:
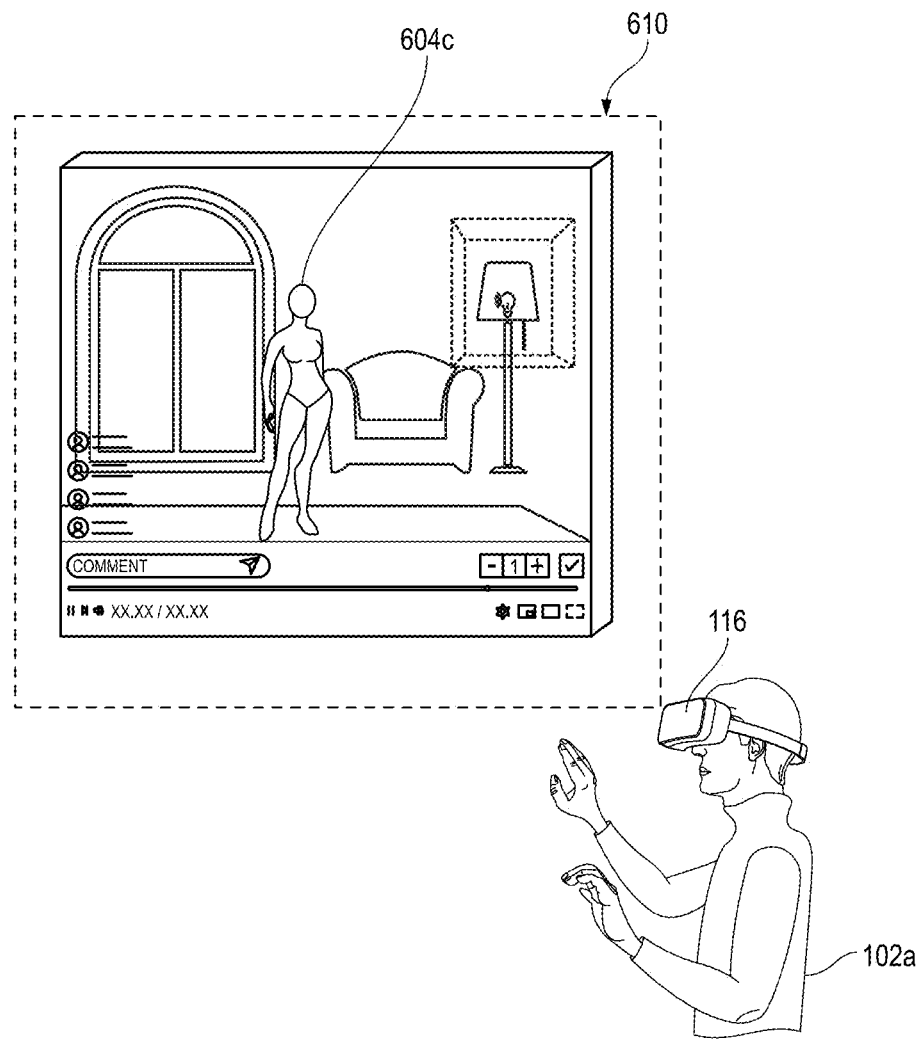

Further, the target element monitoring module 218 tracks the at least one target element such as the hand gesture of the user 102a (as shown in FIG. 6A) to select the content performed by the model user 604c among the plurality of content 602. Herein, the target element monitoring module 218 detects the hand gesture of the user 102a as the target element. Thereafter, the operation entity management module 220 determines the operation entity to be performed in the live broadcast platform 122 corresponding to the target element and the parameter of the target element. The operation entity management module 220 determines the one or more interactive commands as the operation entity based on the selection of the content performed by the model user 604c in the MR environment 600. The one or more interactive commands may include a switch command. Further, in response to executing the switch command, the user 102a is rendered with an MR environment 610 through the head-mounted display 116 to display the content performed by the model user 604c in the field of view of the head-mounted display 116 (as shown in FIG. 6B).

In an embodiment, the eyeball movement (i.e., the at least one target element and the parameters of the at least one target element) of the user 102a may be tracked to determine the interactive commands to interact with the plurality of content 602 of the live broadcast platform 122. In another embodiment, the interactive commands may be determined based on the hand gesture or the eyeball movement of the user 102a in the vertical direction. In this scenario, the interactive commands determined corresponding to the hand gesture or the eyeball movement of the user 102a in the vertical direction may be a scroll command. Additionally, the interactive commands may include a return to the home page command, a return to the previous page command, a lock command to freeze the user interface rendered in the live broadcast platform 122, and the like.

Figure 6C:
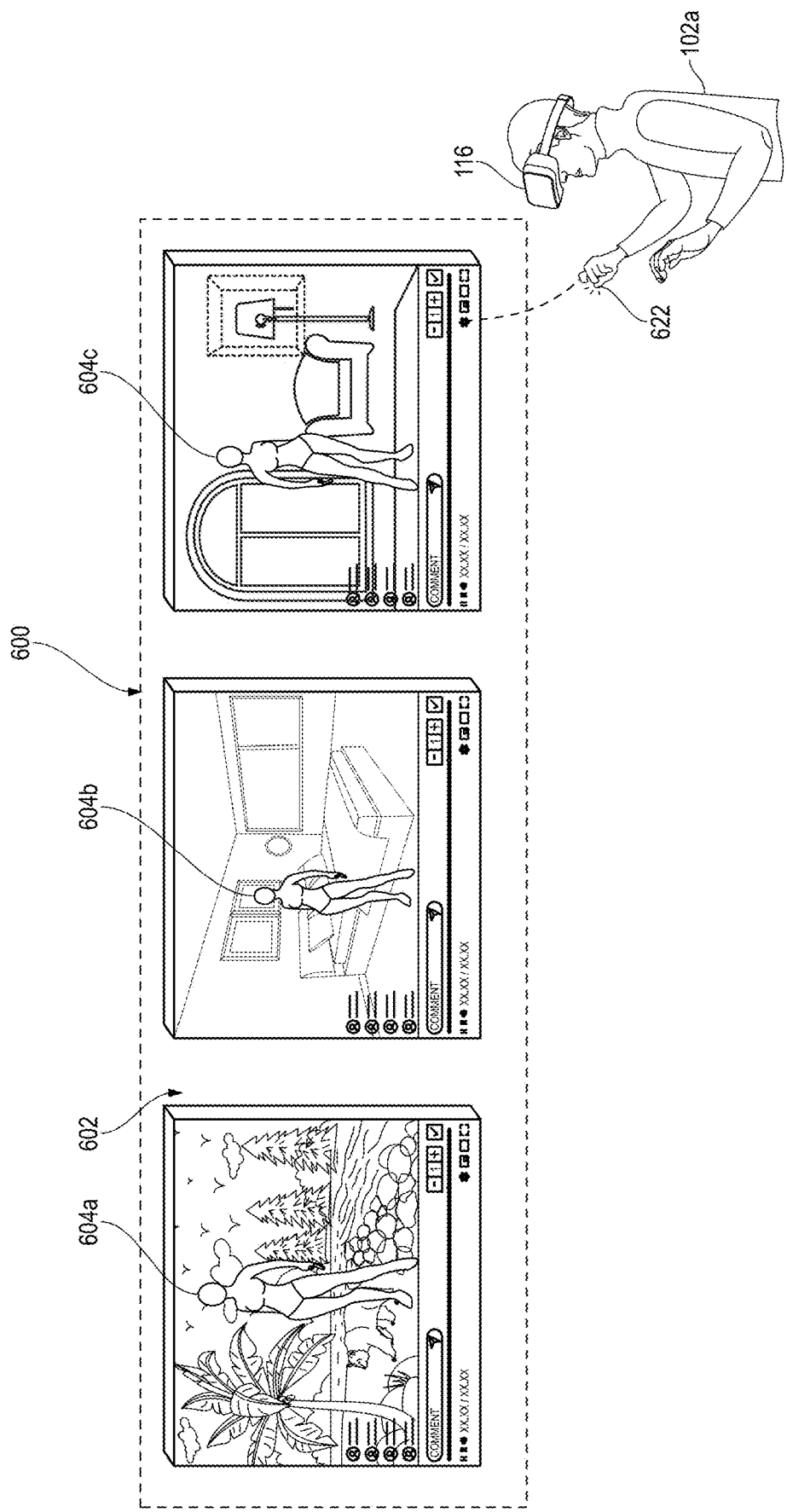

Referring to FIG. 6C, the user 102a may provide a hand gesture 622 (e.g., snapping of the fingers) while watching the plurality of content 602 on the live broadcast platform 122 rendered in the MR environment 600. For example, the gestures (such as the snapping the fingers, twisting of hand, etc.) may be predefined for the live broadcast platform 122. In this scenario, the predefined gesture (i.e., the hand gesture 622) performed by the user 102*a* corresponds to the target element. Further, the operation entity management module 222 determines the interactive commands as the operation entity corresponding to the hand gesture 622 performed by the user 102*a*. In one example, for the hand gesture 622 (e.g., snapping the fingers), the switch command is determined as the operation entity. The switch command (i.e., the operation entity) may be executed to render the content performed by the model user 604*c* in the MR environment 610 as explained with reference to FIG. 6B.

Figure 7A:
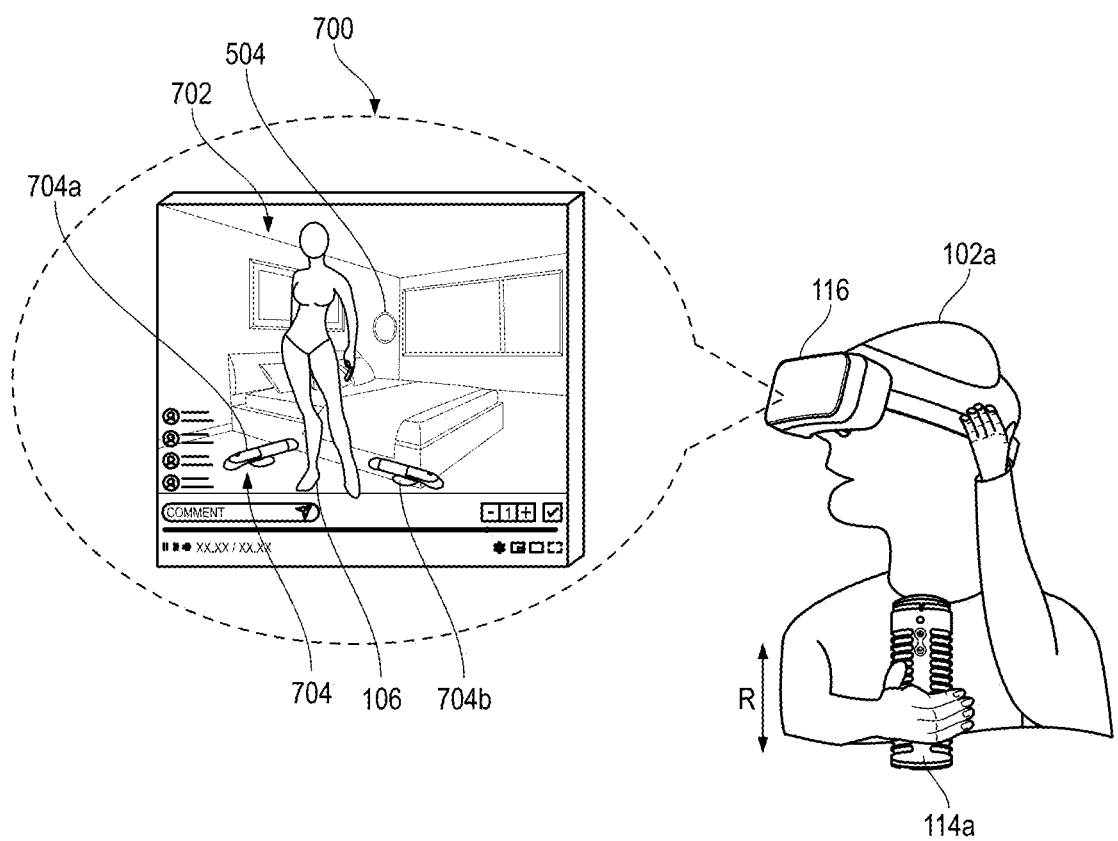
FIGS. 7A and 7B illustrate an example scenario of a mixed reality (MR) environment depicting the controlling of the at least one object in content performed by the model user, in accordance with an embodiment of the present disclosure.

FIG. 7A illustrates an example scenario of a mixed reality (MR) environment 700 depicting the controlling of target objects in content 702 performed by the model user 106, in accordance with an embodiment of the present disclosure. As shown, the user 102*a* wears the head-mounted display 116 and views the content 702 performed by the model user 106 on the live broadcast 122. Further, the MR environment 700 is depicted to include at least one object 704. The at least one object 704 may include an object 704*a* and an object 704*b*. The objects 704*a* and 704*b* may be sex toys (as shown in FIG. 7A). The sex toys as shown in FIG. 7A may be a virtual representation of the sexual stimulation device 112 of the model user 106. In this scenario, the target element monitoring module 218 monitors the target element and the parameters of the target element to determine an object among the at least one object 704. For instance, the target element monitoring module 218 monitors the eye gaze or hand position (i.e., the target element) of the user 102*a* through the head-mounted display 116. Based on the eye gaze or the hand position of the user 102*a*, the object 704*a* may be determined as the operation entity. Further, the control instruction module 222 generates the control instruction for operating the object 704*a* selected by the user 102*a*. In an embodiment, the control instruction may be generated by the live broadcast platform 122 based on the selection of the object 704*a*. In another embodiment, the control instruction may be predefined in the live broadcast platform 122 corresponding to the object 704*a*. Further, the operation entity management module 220 controls the object 704*a* to provide sexual stimulation to the model user 106 in the content 702 based on the control instruction. In addition, the processor 206 may be configured to transmit the control instruction to at least the user terminal 108 of the model user 106. The user terminal 108 further operates the sexual stimulation device 112 corresponding to the control instruction. Furthermore, the processor 206 transmits the control instruction to the user device 104*a* of the user 102*a* for controlling the sexual stimulation device 114*a* of the user 102*a*.

In an embodiment, the user 102*a* may operate the sexual stimulation device 114*a* in a reciprocal manner (exemplarily depicted as 'R') while watching the content 702 through the head-mounted display 116. Herein, the sexual stimulation device 114*a* of the user 102*a* corresponds to the target element. In this scenario, the target element rendering module monitors the movement of the sexual stimulation device 114*a* and triggers the control instruction module 222 to generate the control instruction corresponding to the movement of the sexual stimulation device 114*a* in the reciprocal manner 'R'. Thereafter, the operation entity management module 220 controls the object 704*a* to operate corresponding to the control instruction generated based on the movement of the sexual stimulation device 114*a* in the reciprocal manner 'R'.

Figure 7B:
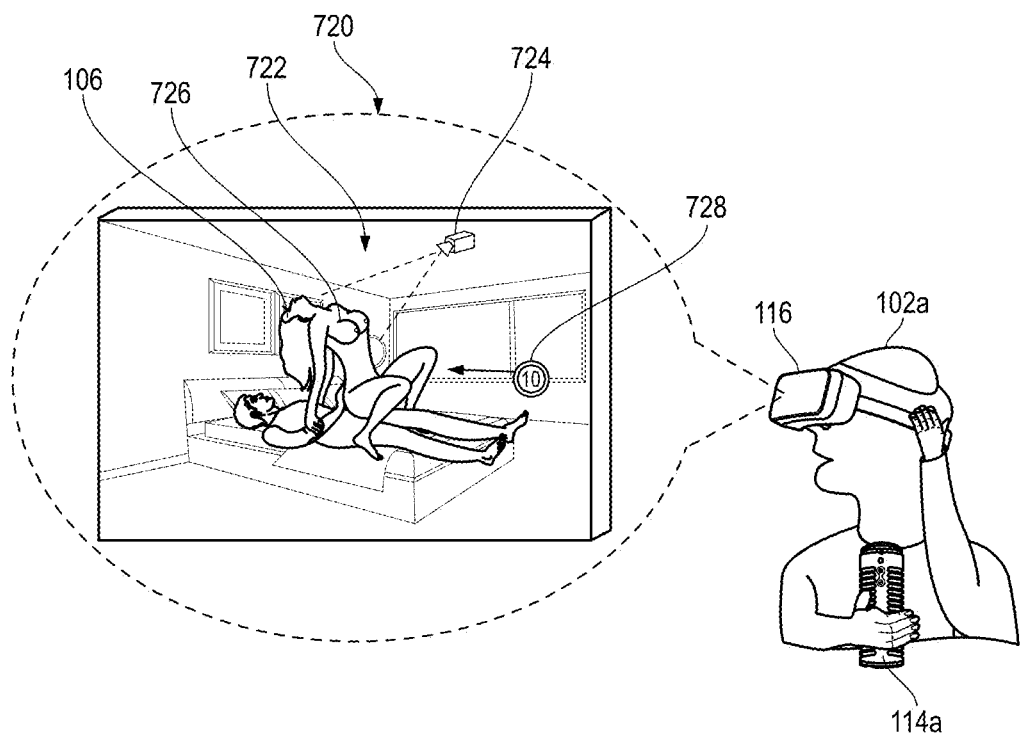

FIG. 7B illustrates an example scenario of a mixed reality (MR) environment 720 depicting the controlling of target objects in content 722 performed by the model user 106, in accordance with an embodiment of the present disclosure. As shown, the user 102*a* wears the head-mounted display 116 and views the content 722 performed by the model user 106 on the live broadcast 122. Further, the MR environment 700 is depicted to include at least one object 724. The at least one object 724 may include an image capturing module (such as the image capturing module 110). In an example, the target element monitoring module 218 monitors the eye gaze or hand position (i.e., the target element) of the user 102*a* through the head-mounted display 116 to detect the at least one object 724. In another example, the target element monitoring module 218 may detect the sexual stimulation device 114*a* held by the user 102*a* as the target element. Based on the target element (such as the eye ball movement or the sexual stimulation device 114*a*), the object 724 may be selected as the operation entity. The operation entity management module 220 may control the at least one object 724 based on the target element (e.g., the eye gaze, hand position, or the sexual stimulation device 114*a*). For example, the operation entity management module 220 may focus the image capturing module 110 (i.e., the at least one object 724) to a chest area 726 of the model user 106.

Additionally, the user 102*a* may provide virtual tokens (see, 728 of FIG. 7B) to the model user 106 performing the content 722 on the live broadcast platform 122. In this scenario, the operation entity management module 220 is configured to determine the at least one operation entity in the content 702 of the model user 106. The at least one operation entity may be the at least one object 724. The at least one operation entity (i.e., the at least one object 724) is selected based on the receipt of the virtual tokens 728 of a predefined value at the model user 106. If the user 102*a* provides the virtual tokens 728 (exemplarily depicted to be '10 tokens') of the predefined value, the operation entity management module 220 controls the image capturing module 110 (i.e., the at least one object 724) to focus on the chest area 726 of the model user 106 for 10 seconds.

Figure 8A:
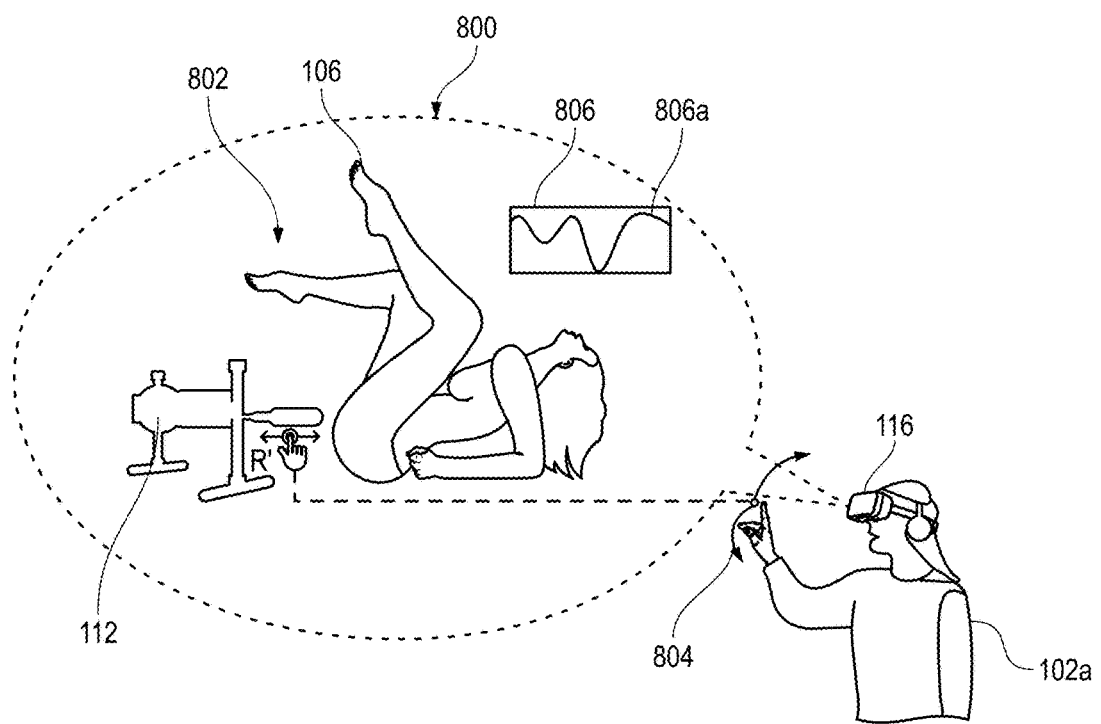
FIG. 8A illustrates an example scenario of a mixed reality (MR) environment depicting the generation of a control instruction, in accordance with an embodiment of the present disclosure.

FIG. 8A illustrates an example scenario of a mixed reality (MR) environment 800 depicting the generation of a control instruction, in accordance with an embodiment of the present disclosure. As shown, the user 102*a* wears the head-mounted display 116 to view content 802 performed by the model user 106 on the live broadcast platform 122. Further, the user 102*a* performs a hand gesture 804 while viewing the content 802 through the head-mounted display 116. Herein, the hand gesture 804 corresponds to the target element. The target element monitoring module 218 monitors the hand gesture 804 (i.e., the target element), and the motion and timing parameters of the hand gesture 804 of the user 102*a*. The control instruction module 222 operates a control instruction tool 806 corresponding to the hand gesture 804 (i.e., the target element), and the motion and timing parameters of the hand gesture 804. In particular, the control instruction module 222 determines the set of control parameters based on the operation of the control instruction tool 806. The set of control parameters may include, but not limited to, the operating intensity and the operating duration. For example, if the motion trajectory of the hand is in a relatively high position relative to the horizontal plane at a certain point, the operating intensity is relatively high. Further, the control instruction module 222 operates the control instruction tool 806 to generate a control instruction 806*a* by appending the set of control parameters. As explained above, the control instruction 806*a* may be configured to control the sexual stimulation device 112 of the model user 106 and the sexual stimulation device 114a of the user 102a.

Figure 8B:
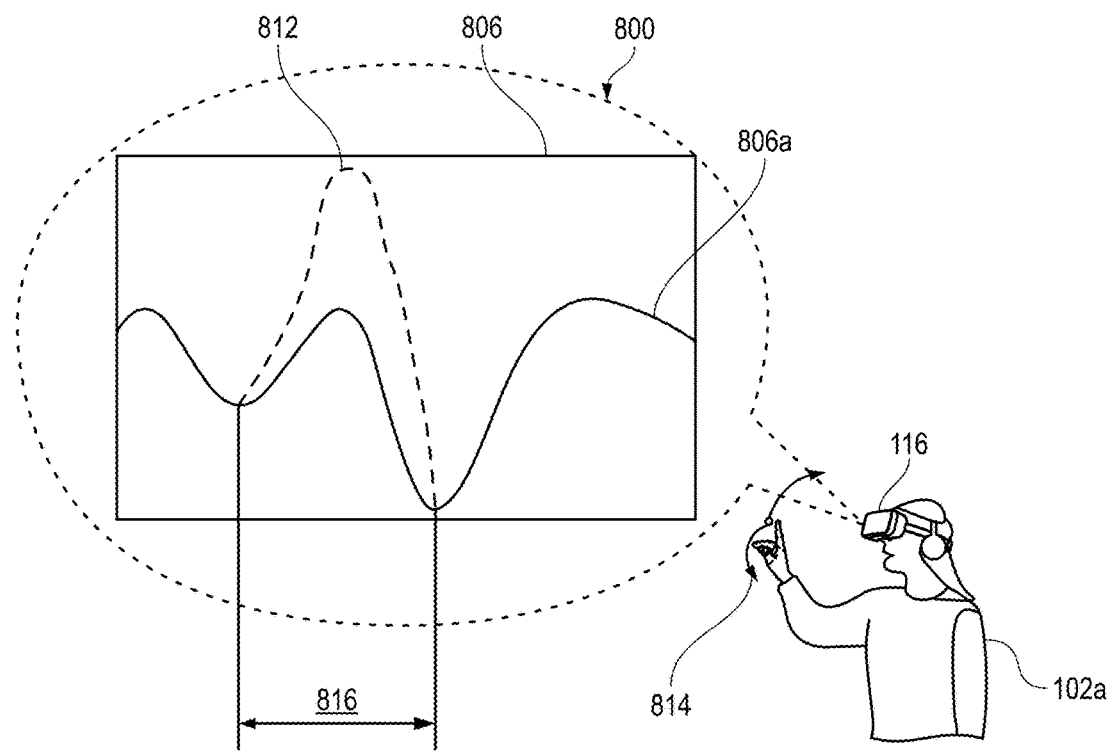
FIG. 8B is an example scenario of a mixed reality (MR) environment depicting the modification of the control instruction of FIG. 8A, in accordance with an embodiment of the present disclosure.

Referring to FIG. 8B, an example scenario of an MR environment 810 is rendered to modify the control instruction 806a, in accordance with an embodiment of the present disclosure. The user 102a may modify the control instruction 806a by performing a hand gesture 814 (i.e., the target element). In this scenario, the target element monitoring module 218 monitors the hand gesture 814 through the head-mounted display 116. Thereafter, the control instruction module 222 adjusts a portion 816 of the control instruction 806a corresponding to the hand gesture 814 of the user 102a. For example, the magnitude of the portion 816 is increased based on the hand gesture 814 of the user 102a. Herein, the hand gesture 814 corresponds to the at least one target element and the trajectory of the hand gesture 814 may be referred to as at least one modified parameter associated with the at least one target element. Further, the control instruction module 222 generates a modified control instruction 812 based on the hand gesture 814. In particular, the control instruction module 222 determines the set of control parameters based on the hand gesture 814, and generates the control instruction 812 based on the set of control parameters determined from the hand gesture 814.

Figure 9:
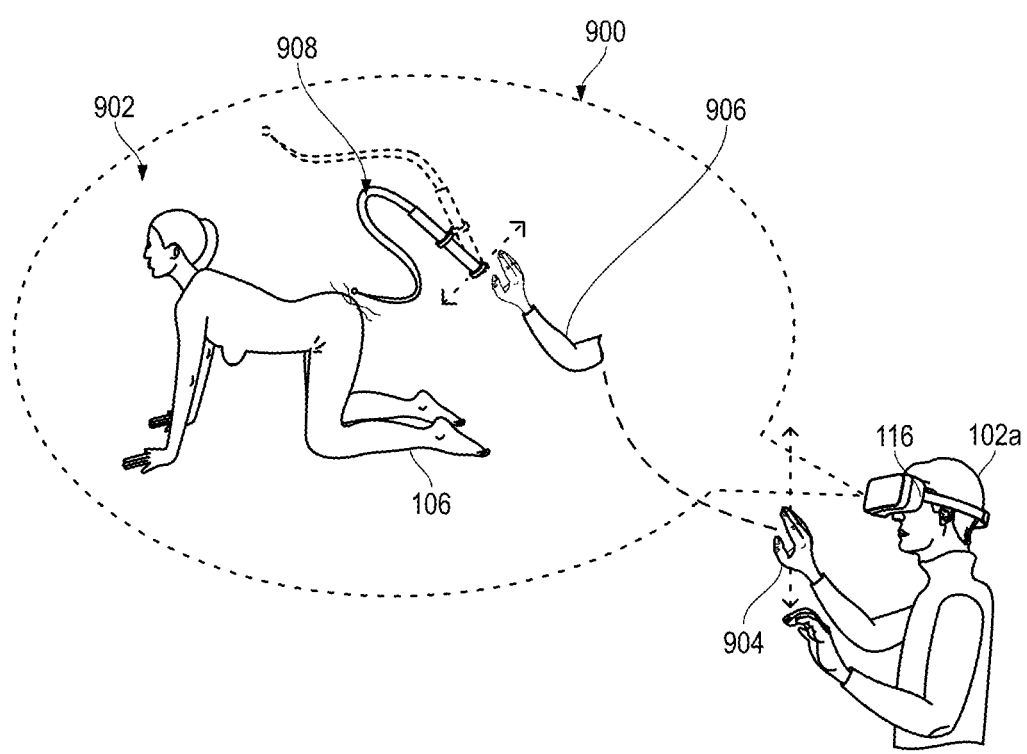
FIG. 9 illustrates an example scenario of a mixed reality (MR) environment depicting the rendering of media content, in accordance with an embodiment of the present disclosure.

FIG. 9 illustrates an example scenario of a mixed reality (MR) environment 900 depicting the rendering of media content, in accordance with an embodiment of the present disclosure. As shown, the user 102a wears the head-mounted display 116 and views content 902 of the model user 106 on the live broadcast platform 122. The user 102a may provide a hand gesture 904 while viewing the content 902 through the head-mounted display 116. Herein, the hand gesture 904 corresponds to the target element. For example, the hand gesture 804 may be a waving gesture. Further, the MR environment 900 is depicted to include a visual representation (see, 906) of the hand gesture 904. In this scenario, the target element monitoring module 218 tracks the hand gesture 904 (e.g., the waving gesture) and the parameters of the hand gesture 904, and triggers the media content module 224. The media content module 224 generates media content 908 corresponding to the hand gesture 904. For example, the media content 908 may include the swinging of a whip hitting the buttocks of the model user 106. Further, the operation entity management module 220 renders the media content 908 as the operation entity in the content 902 to provide a sexual experience to the user 102a. Additionally, the media content module 224 may generate a sound effect of the whip hitting the buttocks of the model user 106 in response to the hand gesture 904 of the user 102a. The media content 908 including the animation of the whip hitting the buttocks of the model user 102a and the corresponding sound effect is rendered to the user 102a through the head-mounted display 116 to provide sexual entertainment.

In some of these embodiments, a system comprises a camera and a projection device; wherein motion of the at least one physical object is captured by the camera, and the projection device manipulates a corresponding operative object based on the motion of the at least one physical object. In this way, the user can operate the toy or other sexual entertainment activities by the movement of the body parts of the hands, feet, or head, and the user can freely operate the adult toy or other sexual entertainment activities according to his or her own operating habits, and the user can operate the toy or other sexual entertainment activities in a normal and efficient manner without observing the operating buttons and the interface controls on the screen. In addition, the projection device may generate corresponding multimedia content based on the movement of the at least one solid object and project it for playback. As for the specific manipulation and content generation methods, reference can be made to the contents of the relevant embodiments above, and will not be repeated herein. As an illustration, the system captures the user's body movements, such as the movements of the hands, feet or head, by means of a camera, and converts these movements into control signals for the manipulated objects. Such a system enables a user to control a sexually stimulating device or other sexual entertainment through body movements without directly operating physical buttons or viewing a screen. The following are examples: Motion Capture and Transformation: The system uses a camera to capture the user's body movements, such as gestures, position, and trajectory. This motion information is converted into digital signals that are used to control other devices or software functions. Real-time interactive control: The system is able to respond to the user's movements in real time to control sexual stimulation devices or other devices related to sexual entertainment. This means that the user can operate the device through natural body language rather than traditional buttons or touch screens. Multimedia Content Generation: The system not only controls the device, but also generates multimedia content, such as video, audio or images, and projects them in response to the user's movements. This content generation enhances the user's immersion and entertainment experience.

Figure 10:
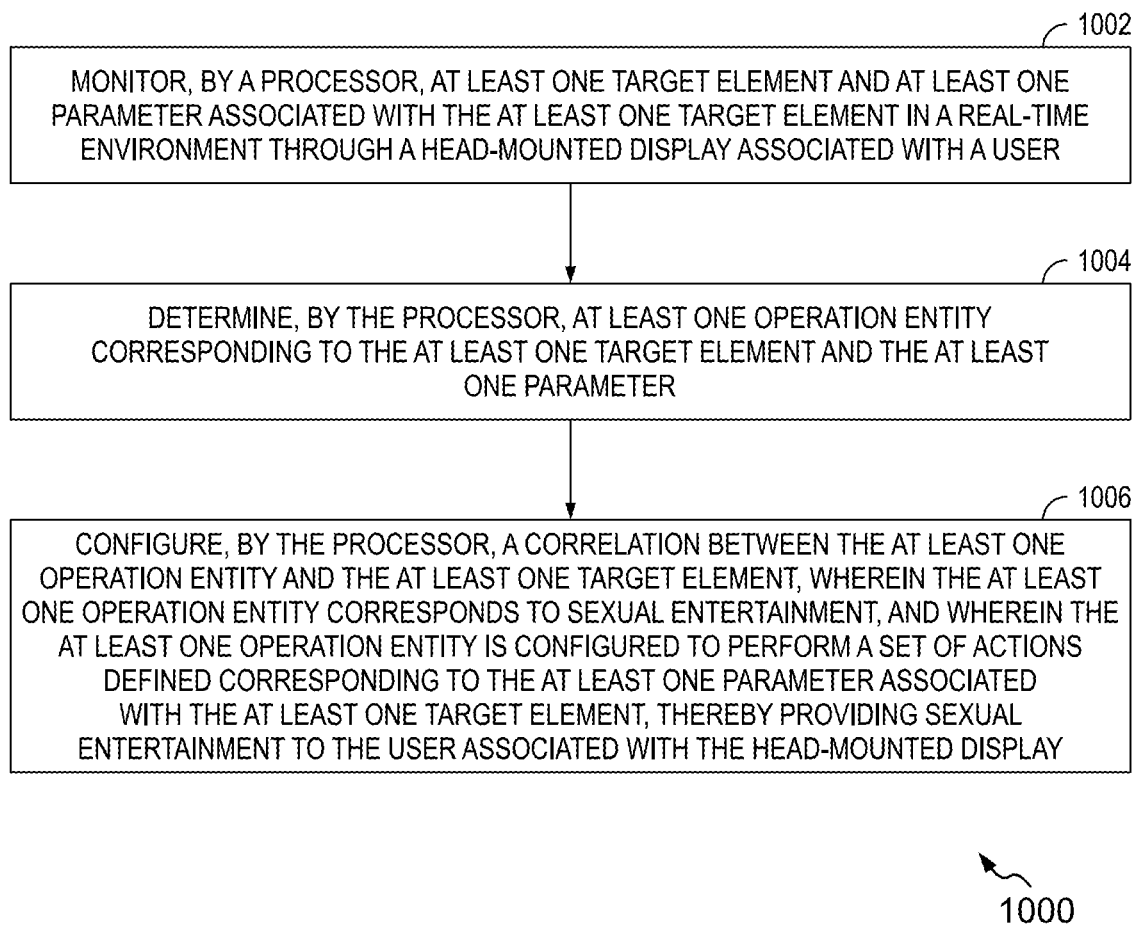
FIG. 10 illustrates a flow diagram of a computer-implemented method for providing sexual entertainment by monitoring the target elements, in accordance with an embodiment of the present disclosure.

FIG. 10 illustrates a flow diagram of a computer-implemented method 1000 for providing sexual entertainment by monitoring target elements, in accordance with an embodiment of the present disclosure. The method 1000 depicted in the flow diagram may be executed by, for example, the system 200 or the system 120. Operations of the flow diagram of the method 1000, and combinations of the operations in the flow diagram of the method 1000, may be implemented by, for example, hardware, firmware, a processor, circuitry, and/or a different device associated with the execution of software that includes one or more computer program instructions. It is noted that the operations of the method 1000 can be described and/or practiced by using a system other than the system 200. The method 1000 starts at operation 1002.

At operation 1002, the method 1100 includes monitoring, by the processor 206, the at least one target element and the at least one parameter associated with the at least one target element in the real-time environment through the head-mounted display 116 associated with a user (e.g., the user 102a).

At operation 1004, the method 1000 includes determining, by the processor 206, the at least one operation entity corresponding to the at least one target element.

At operation 1006, the method 1000 includes configuring, by the processor 206, a correlation between the at least one operation entity and the at least one target element. The at least one operation entity corresponds to sexual entertainment. The at least one operation entity is configured to perform the set of actions defined corresponding to the at least one parameter associated with the at least one target element, thereby providing sexual entertainment to the user 102a associated with the head-mounted display 116. Further, the one or more operations for providing the sexual entertainment are already explained with reference to FIGS. 1-10, therefore they are not reiterated herein for the sake of brevity.

Figure 11:
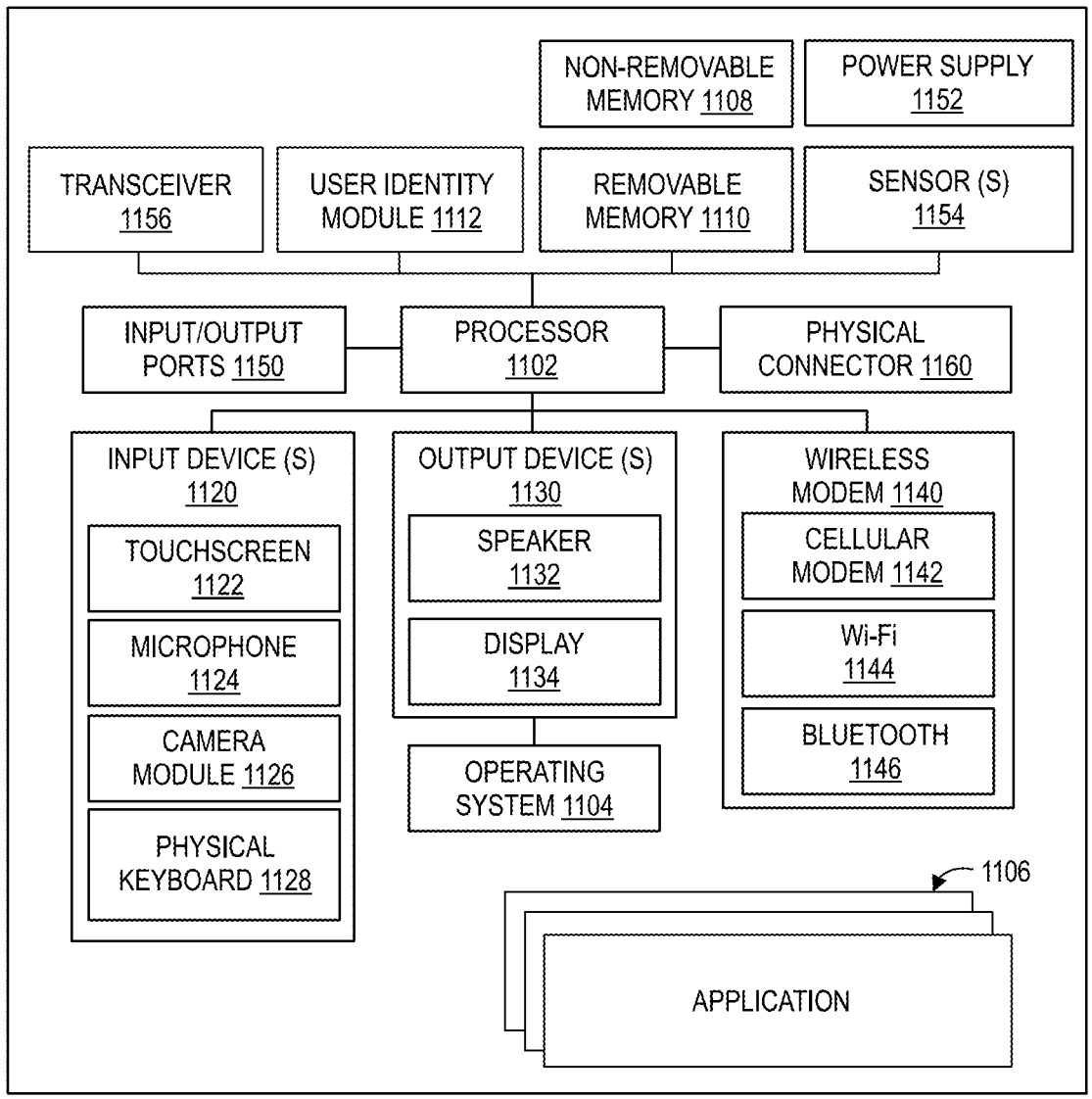
FIG. 11 is a simplified block diagram of an electronic device capable of implementing various embodiments of the present disclosure.

FIG. 11 is a simplified block diagram of an electronic device 1100 capable of implementing various embodiments of the present disclosure. For example, the electronic device 1100 may correspond to the user devices 104a-104c, the user terminal 108, and the head-mounted display 116 of FIG. 1. The electronic device 1100 is depicted to include one or more applications 1106. For example, the one or more applications 1106 may include the live broadcast platform 122 of FIG. 1. The one or more applications 1106 installed on the electronic device 1100 is capable of communicating with a server (i.e., the system 200 or the system 120) to render simulated MR environments for providing enhanced sexual experience.

It should be understood that the electronic device 1100 as illustrated and hereinafter described is merely illustrative of one type of device and should not be taken to limit the scope of the embodiments. As such, it should be appreciated that at least some of the components described below in connection with the electronic device 1100 may be optional and thus in an embodiment may include more, less, or different components than those described in connection with the embodiment of the FIG. 11. As such, among other examples, the electronic device 1100 could be any mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the electronic device 1100 and supports one or more operations of the application (see, the applications 1106) that implements one or more of the innovative features described herein. In addition, the applications 1106 may include common mobile computing applications (e.g., telephony applications, email applications, calendars, contact managers, web browsers, messaging applications) or any other computing application.

The illustrated electronic device 1100 includes one or more memory components, for example, a non-removable memory 1108 and/or removable memory 1110. The non-removable memory 1108 and/or the removable memory 1110 may be collectively known as a database in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. The electronic device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in the form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1100 can support one or more input devices 1120 and one or more output devices 1130. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to, a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device, or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the electronic device 1100 and a public switched telephone network (PSTN).

The electronic device 1100 can further include one or more input/output ports 1150, a power supply 1152, one or more sensors 1154 for example, an accelerometer, a gyroscope, a compass, or an infrared proximity sensor for detecting the orientation or motion of the electronic device 1100 and biometric sensors for scanning biometric identity of an authorized user, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

The disclosed method with reference to FIG. 10, or one or more operations of the system 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or Digital Signal Processor (DSP) circuitry).

Particularly, the system 200 and its various components may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based on these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   monitoring, by a processor based on information rendered by a head-mounted display associated with a user, (i) at least one target element present in a real-time environment viewed by the user through the head-mounted display, and (ii) at least one parameter associated with the at least one target element;
   determining, by the processor, at least one operation entity corresponding to the at least one target element;
   correlating, by the processor, the at least one target element with the at least one operation entity, the at least one operation entity relating to sexual entertainment; and
   controlling, by the processor, the at least one operation entity to perform a set of actions corresponding to the at least one parameter associated with the at least one target element, thereby providing sexual entertainment to the user.

2. The computer-implemented method as claimed in claim 1, wherein the at least one target element comprises at least one of a sexual stimulation device associated with a model user, a sexual stimulation device associated with the user, a user device of the user, the head-mounted display, body parts, and gestures performed by the body parts, and
   wherein the at least one parameter comprises at least one of a timing parameter and a motion parameter.

3. The computer-implemented method as claimed in claim 1, further comprising:
   determining, by the processor, the at least one operation entity based on monitoring of at least one of a motion parameter and a timing parameter of the at least one parameter associated with the at least one target element,
   wherein the processor controls the at least one operation entity to perform the set of actions corresponding to the at least one parameter associated with the at least one target element, and
   wherein the at least one operation entity comprises at least one of a sexual stimulation device associated with a model user, a sexual stimulation device of the user, a functional part of the sexual stimulation device of the user and the sexual stimulation device of the model user, and a control component of the sexual stimulation device of the user and the sexual stimulation device of the model user.

4. The computer-implemented method as claimed in claim 1, further comprising:

monitoring, by the processor, a first target element of the at least one target element;

determining, by the processor, at least one operation entity corresponding to the first target element; and determining, by the processor, a set of parameters for controlling the at least one operation entity, the set of parameters being determined based at least on monitoring of a second target element of the at least one target element and a motion parameter associated with the second target element.

5. The computer-implemented method as claimed in claim 4, wherein the at least one operation entity comprises at least one of a sexual stimulation device of the user and a sexual stimulation device of a model user;

wherein the set of parameters comprises at least one of a speed, a distance, a frequency, an amplitude, positional coordinates, an operating duration, an operating mode, and a type of a sexual stimulation, and wherein the sexual stimulation device of the model user and the sexual stimulation device of the user are operated based on the set of parameters determined based on the motion parameter associated with the second target element.

6. The computer-implemented method as claimed in claim 1, further comprising:

identifying, by the processor, a type of the at least one target element based at least on implementing one or more artificial intelligence (AI) models; and determining, by the processor, the at least one operation entity comprising a token value corresponding to the type of the at least one target element and the at least one parameter associated with the at least one target element, wherein the token value is determined based on matching the at least one target element and the at least one parameter with a token mapping table, the token mapping table comprising predefined token values for each type of the at least target element and the at least one parameter.

7. The computer-implemented method as claimed in claim 1, further comprising:

determining, by the processor, an object value of at least one object, the at least one object being identified in content being performed by a model user based on monitoring of the at least one target element through the head-mounted display associated with the user; and computing, by the processor, a token value corresponding to the object value of the at least one object based at least on a predefined conversion value, wherein the at least one operation entity comprises virtual tokens rendered to the model user based on the token value corresponding to the object value of the at least one object.

8. The computer-implemented method as claimed in claim 1, further comprising:

monitoring, by the processor, the at least one parameter of the at least one target element while a plurality of live broadcast platform contents are rendered in the field of view of the user through the head-mounted display; and determining, by the processor, the at least one operation entity to be controlled in the live broadcast platform based on the at least one parameter of the at least one target element, the at least one operation entity comprising one or more interactive commands for interacting with the plurality of live broadcast platform contents.

9. The computer-implemented method as claimed in claim 1, further comprising:

determining, by the processor, the at least one operation entity based on the at least one target element and the at least one parameter, the at least one operational entity being determined in content of a model user being rendered on a live broadcast platform in a field of view of the user through the head-mounted display, wherein the processor controls the at least one operation entity determined in the content in response to determining receipt of virtual tokens of a predefined value by the model user.

10. The computer-implemented method as claimed in claim 1, further comprising:

determining, by the processor, a token target based at least on monitoring a first target element of the at least one target element and a motion parameter of the at least one parameter associated with the first target element;

determining, by the processor, the at least one operation entity based on determining the token target, the at least one operation entity corresponding to a token rendering tool; and determining, by the processor, a token parameter associated with the at least one operation entity based at least on monitoring a second target element of the at least one target element and the motion parameter of the at least one parameter associated with the second target element, wherein the token rendering tool executes the token parameter for providing virtual tokens on the token target.

11. The computer-implemented method as claimed in claim 1, further comprising:

determining, by the processor, a set of control parameters based on monitoring the at least one target element and the at least one parameter of the at least one target element, the set of control parameters comprising at least one of an operating intensity and an operating duration; and operating, by the processor, a control instruction tool based on monitoring of the at least one target element and the at least one parameter of the at least one target element to generate a control instruction by appending the set of control parameters, the control instruction being configured to control at least a sexual stimulation device of a model user and a sexual stimulation device of the user corresponding to the at least one parameter of the at least one target element.

12. The computer-implemented method as claimed in claim 11, further comprising:

facilitating, by the processor, the at least one operation entity to modify the control instruction in the control instruction tool in response to identifying at least one modified parameter associated with the at least one target element.

13. The computer-implemented method as claimed in claim 1, further comprising:

tracking an eye of the user while the real-time environment is being viewed by the user through the head-mounted display, and in response to determining, based on the tracking, a predetermined eye movement or eye gesture performed by the user with respect to a component included in the real-time environment being viewed by the user through by the head-mounted display:

setting a device associated with the component as the operation entity; and generating control instruction information for controlling the device based on parameters associated with the predetermined eye movement or gesture, thereby enabling the device to perform the set of actions.

14. A system, comprising:
   a communication interface;
   a memory storing executable instructions; and
   a processor operatively coupled with the communication interface and the memory, the processor being configured to execute the executable instructions to control the system to execute processes comprising:
      monitoring, based on information rendered by a head-mounted display associated with a user, (i) at least one target element present in a real-time environment viewed by the user through the head-mounted display, and (ii) at least one parameter associated with the at least one target element;
      determine at least one operation entity corresponding to the at least one target element;
      correlating the at least one target element with at least one operation entity, the at least one operation entity relating to sexual entertainment; and
      controlling the at least one operation entity to perform a set of actions corresponding to the at least one parameter associated with the at least one target element, thereby providing sexual entertainment to the user.

15. The system as claimed in claim 14, wherein the processes further comprise:
   determining the at least one operation entity based on monitoring the at least one of a motion parameter and a timing parameter of the at least one parameter associated with the at least one target element,
   wherein the at least one operation entity is controlled to perform the set of actions corresponding to the at least one parameter associated with the at least one target element, and
   wherein the at least one operation entity comprises at least a sexual stimulation device associated with a model user, a sexual stimulation device of the user, a functional part of the sexual stimulation device of the user and the sexual stimulation device of the model user, and a control component of the sexual stimulation device of the user and the sexual stimulation device of the model user.

16. The system as claimed in claim 14, wherein the processes further comprise:
   monitoring a first target element of the at least one target element;
   determining at least one operation entity corresponding to the first target element, the at least one operation entity comprising one of a sexual stimulation device of the user and a sexual stimulation device of a model user; and
   determining a set of parameters for controlling the at least one operation entity, the set of parameters being determined based at least on monitoring of a second target element of the at least one target element and on a motion parameter associated with the second target element,
   wherein the set of parameters comprises at least one of a speed, a distance, a frequency, an amplitude, positional coordinates, an operating duration, an operating mode, and a type of a sexual stimulation, and
   wherein the sexual stimulation device of the model user and the sexual stimulation device of the user are operated based on the set of parameters determined based on the motion parameter associated with the second target element.

17. The system as claimed in claim 14, wherein the processes further comprise:
   identifying a type of the at least one target element based at least on implementing one or more artificial intelligence (AI) models; and
   determining the at least one operation entity comprising a token value corresponding to the type of the at least one target element and the at least one parameter associated with the at least one target element,
   wherein the token value is determined based on matching the at least one target element and the at least one parameter with a token mapping table, the token mapping table comprising predefined token values for each type of the at least target element and the at least one parameter,
   wherein determining the token value further comprises:
      determining an object value of at least one object, the at least one object being identified in content being performed by a model user based on monitoring of the at least one target element through the head-mounted display associated with the user, and
      computing the token value corresponding to the object value of the at least one object based at least on a predefined conversion value, and
   wherein the at least one operation entity comprises virtual tokens rendered to the model user based on the token value corresponding to the object value of the at least one object.

18. The system as claimed in claim 14, wherein the processes further comprise:
   monitoring the at least one parameter of the at least one target element while a plurality of live broadcast platform contents are rendered in the field of view of the user through the head-mounted display; and
   determining the at least one operation entity to be controlled in the live broadcast platform based on the at least one parameter of the at least one target element, the at least one operation entity comprising one or more interactive commands for interacting with the plurality of live broadcast platform contents and the at least one target element of the live broadcast platform.

19. The system as claimed in claim 14, wherein the processes further comprise:
   generating a control instruction based on a selection of a sexual stimulation device of a model user rendered in content on a live broadcast platform, the sexual stimulation device of the model user corresponding to the at least one target element; and
   transmitting the control instruction to at least a user terminal of the model user and a user device of the user for controlling the sexual stimulation device of the model user and the sexual stimulation device of the user, respectively.

20. The system as claimed in claim 14, wherein the at least one target element comprises at least one of a sexual stimulation device associated with a model user, a sexual stimulation device associated with the user, a user device of the user, the head-mounted display, body parts, and gestures performed by the body parts, and
   wherein the at least one parameter comprises a timing parameter and a motion parameter.

21. A non-transitory computer-readable storage medium having a program stored thereon, the program being executable to control a hardware processor to execute processes comprising:
- monitoring, based on information rendered by a head-mounted display associated with a user, (i) at least one target element present in a real-time environment viewed by the user through the head-mounted display, and (ii) at least one parameter associated with the at least one target element;
- determining at least one operation entity corresponding to the at least one target element;
- correlating the at least one target element with the at least one operation entity, the at least one operation entity relating to sexual entertainment; and
- controlling the at least one operation entity to perform a set of actions corresponding to the at least one parameter associated with the at least one target element, thereby providing sexual entertainment to the user.

* * * * *